(12) United States Patent
Kim et al.

(10) Patent No.: US 11,145,037 B1
(45) Date of Patent: Oct. 12, 2021

(54) BOOK SCANNING USING MACHINE-TRAINED MODEL

(71) Applicant: VoyagerX, Inc.

(72) Inventors: Moogung Kim, Seoul (KR); Kunwoo Park, Seoul (KR); Eunsung Han, Seoul (KR); Sedong Nam, Seoul (KR)

(73) Assignee: VoyagerX, Inc., Seoul (KR)

( * ) Notice: Subject to any disclaimer, the term of this patent is extended or adjusted under 35 U.S.C. 154(b) by 0 days.

(21) Appl. No.: 17/240,808

(22) Filed: Apr. 26, 2021

Related U.S. Application Data

(63) Continuation of application No. 17/139,863, filed on Dec. 31, 2020, now Pat. No. 10,991,081.

(51) Int. Cl.
*G06T 7/00* (2017.01)
*G06T 5/00* (2006.01)
(Continued)

(52) U.S. Cl.
CPC .............. *G06T 5/006* (2013.01); *G06T 5/20* (2013.01); *G06T 7/74* (2017.01); *H04N 1/387* (2013.01)

(58) Field of Classification Search
CPC ..... G06T 3/0093; G06T 3/0031; G06T 5/006; G06T 5/20; G06T 5/007; G06T 7/74; G06T 7/13; G06T 2207/30176; G06T 2207/10008; G06T 15/00; G06T 17/00; G06T 17/20; G06T 19/20; G06T 2210/44; G06T 2219/2021; H04N 1/387; H04N 1/00307; H04N 1/00681; H04N 1/401; H04N 1/4092; H04N 1/00; H04N 1/10; H04N 1/195; H04N 1/3878; H04N 2201/0434; H04N 2201/0436; H04N 2201/02439; H04N 2201/04794;
(Continued)

(56) References Cited

U.S. PATENT DOCUMENTS

| | | |
|---|---|---|
| 5,585,926 A | 12/1996 | Fujii et al. |
| 5,760,925 A | 6/1998 | Saund et al. |

(Continued)

FOREIGN PATENT DOCUMENTS

| | | |
|---|---|---|
| EP | 1110373 B1 | 1/2008 |
| EP | 2862128 A1 | 10/2015 |

(Continued)

OTHER PUBLICATIONS

Taeho Gil, Document Image Dewarping and Scene Text Rectification based on Alignment Properties, 2017 http://s-space.snu.ac.kr/bitstream/10371/136804/1/000000145460.pdf.

(Continued)

*Primary Examiner* — Jose L Couso
(74) *Attorney, Agent, or Firm* — K&L Gates LLP

(57) ABSTRACT

This application discloses a technology for flattening a photographed page of a book and straightening texts therein. The technology uses one or more mathematical models to represent a curved shape of the photographed page with certain parameters. The technology also uses one or more photographic image processing techniques to dewarp the photographed page using the parameters of the curved shape. The technology uses one or more additional parameters that represent certain features of the photographed page to dewarp the photographed page.

15 Claims, 16 Drawing Sheets

(51) Int. Cl.
*G06T 5/20* (2006.01)
*G06T 7/73* (2017.01)
*H04N 1/387* (2006.01)

(58) Field of Classification Search
CPC ......... G06K 2009/363; G06K 2209/01; G06K 9/00442; G06K 9/32; G06K 9/00463; G06K 9/325; G06K 9/3208; G06K 9/3275; G06K 9/3283; G06K 9/42; G06K 9/0469; G06K 9/3258; G06F 3/0483
See application file for complete search history.

(56) References Cited

U.S. PATENT DOCUMENTS

| | | | |
|---|---|---|---|
| 5,764,383 A | 6/1998 | Saund et al. | |
| 6,741,279 B1 | 5/2004 | Allen | |
| 7,072,527 B1 | 7/2006 | Kaisha | |
| 7,418,126 B2 | 8/2008 | Fujimoto et al. | |
| 7,463,772 B1 | 12/2008 | Lefevere et al. | |
| 7,471,848 B2 | 12/2008 | Fujimoto et al. | |
| 8,406,476 B2 * | 3/2013 | Wu | G06K 9/3283 382/112 |
| 8,787,695 B2 | 7/2014 | Wu et al. | |
| 9,195,819 B2 | 11/2015 | Hudson et al. | |
| 9,305,211 B2 | 4/2016 | Kwon et al. | |
| 9,317,893 B2 | 4/2016 | Chen | |
| 9,495,587 B2 | 11/2016 | Wilson et al. | |
| 9,563,957 B1 | 2/2017 | Choi | |
| 9,672,510 B2 | 6/2017 | Roach et al. | |
| 9,992,471 B2 | 6/2018 | Chiu et al. | |
| 10,068,132 B2 | 9/2018 | Gaskill et al. | |
| 10,289,924 B2 | 5/2019 | Campbell | |
| 10,991,081 B1 * | 4/2021 | Kim | G06K 9/00442 |
| 11,030,488 B1 * | 6/2021 | Kim | G06K 9/00463 |
| 2008/0175507 A1 | 7/2008 | Lookingbill et al. | |
| 2010/0014782 A1 | 1/2010 | Fero et al. | |
| 2010/0225937 A1 | 9/2010 | Simske et al. | |
| 2011/0299775 A1 * | 12/2011 | Kluzner | G06K 9/3283 382/173 |
| 2013/0343609 A1 | 12/2013 | Wilson et al. | |
| 2014/0198981 A1 | 7/2014 | Wilson et al. | |
| 2014/0247470 A1 | 9/2014 | Hunt et al. | |
| 2015/0093018 A1 | 4/2015 | Macciola et al. | |
| 2015/0093033 A1 | 4/2015 | Kwon et al. | |
| 2017/0243052 A1 | 8/2017 | Sugama et al. | |
| 2017/0262163 A1 | 9/2017 | Nimura | |
| 2017/0372460 A1 | 12/2017 | Zagaynov et al. | |
| 2020/0186672 A1 | 6/2020 | Zhou | |

FOREIGN PATENT DOCUMENTS

| | | |
|---|---|---|
| EP | 3049947 A1 | 7/2017 |
| JP | 4847592 B2 | 12/2011 |
| WO | 2017185407 A1 | 11/2017 |

OTHER PUBLICATIONS

Michael P Cutter, Capture and Dewarping of Page Spreads With a Handheld Compact 3D Camera, Mar. 2012.

Jian Liang, Flattening Curved Documents in Images, IEEE Computer Society Conference on Computer Vision and Pattern Recognition, Jul. 2005.

Fujitsu Develops Technology to Correct Curvature in Scanned Images of Book Pages, Jul. 10, 2013 https://www.fujitsu.com/global/about/resources/news/press-releases/2013/0710-03.html.

Faisal Shafait, Document Image Dewarping Contest, Jan. 2007.

Sruthy S, Dewarping on Camera Document Images, International Journal of Pure and Applied Mathematics, vol. 119 No. 16, 2018, 1019-1044 https://acadpubl.eu/hub/2018-119-16/1/97.pdf.

Koichi Kise, Camera-Based Document Analysis And Recognition, Proceedings of the Second International Workshop on Camera-Based Document Analysis and Recognition, Sep. 22, 2007.

Matt Zucker, Page dewarping, Aug. 15, 2016 https://mzucker.github.io/2016/08/15/page-dewarping.html.

N. Stamatopoulos, A Two-Step Dewarping of Camera Document Images, The Eighth IAPR Workshop on Document Analysis Systems, Sep. 2008.

Ke Ma, DocUNet: Document Image UnWarping via A Stacked U-Net, 2018.

Adrian Ulges, Document Image Dewarping using Robust Estimation of Curled Text Lines, ICDAR 2005 vol. 1, pp. 1001-1005, 2005.

Gaofeng Meng et al., Active Flattening of Curved Document Images via Two Structured Beams, CVPR2014, vol. 1, pp. 3890-3897, 2014.

Bin Fu et al., A Model-based Book Dewarping Method Using Text Line Detection, CBDAR 2007, 2007.

Jongmin Baek, Fast Document Rectification and Enhancement, Aug. 16, 2016 https://blogs.dropbox.com/tech/2016/08/fast-document-rectification-and-enhancement/.

VoyagerX, screenshots of vFlat application on Google Play pages, as of Jun. 3, 2021, Source: https://play.google.com/store/apps/details?id=com.voyagerx.scanner.

* cited by examiner

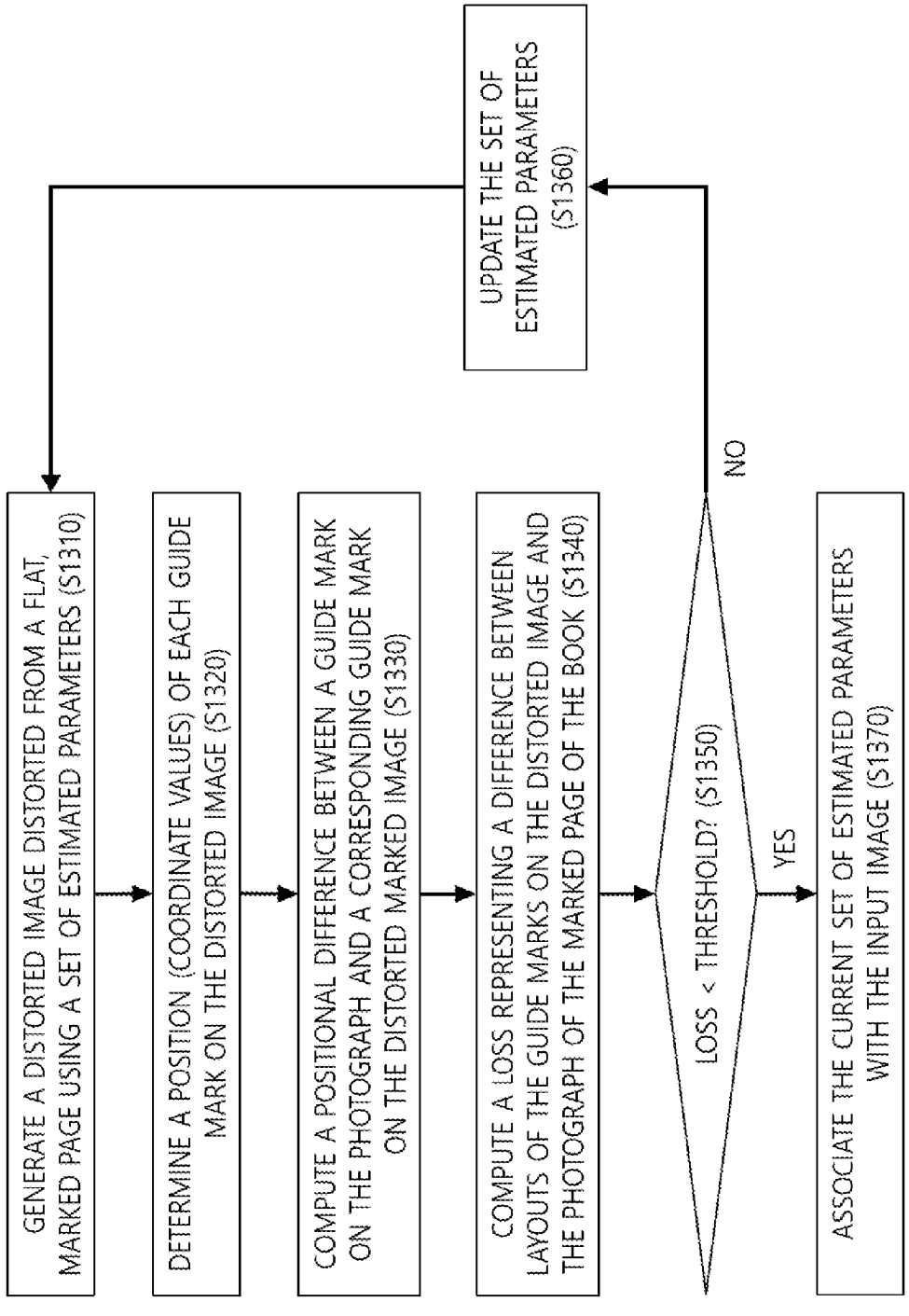

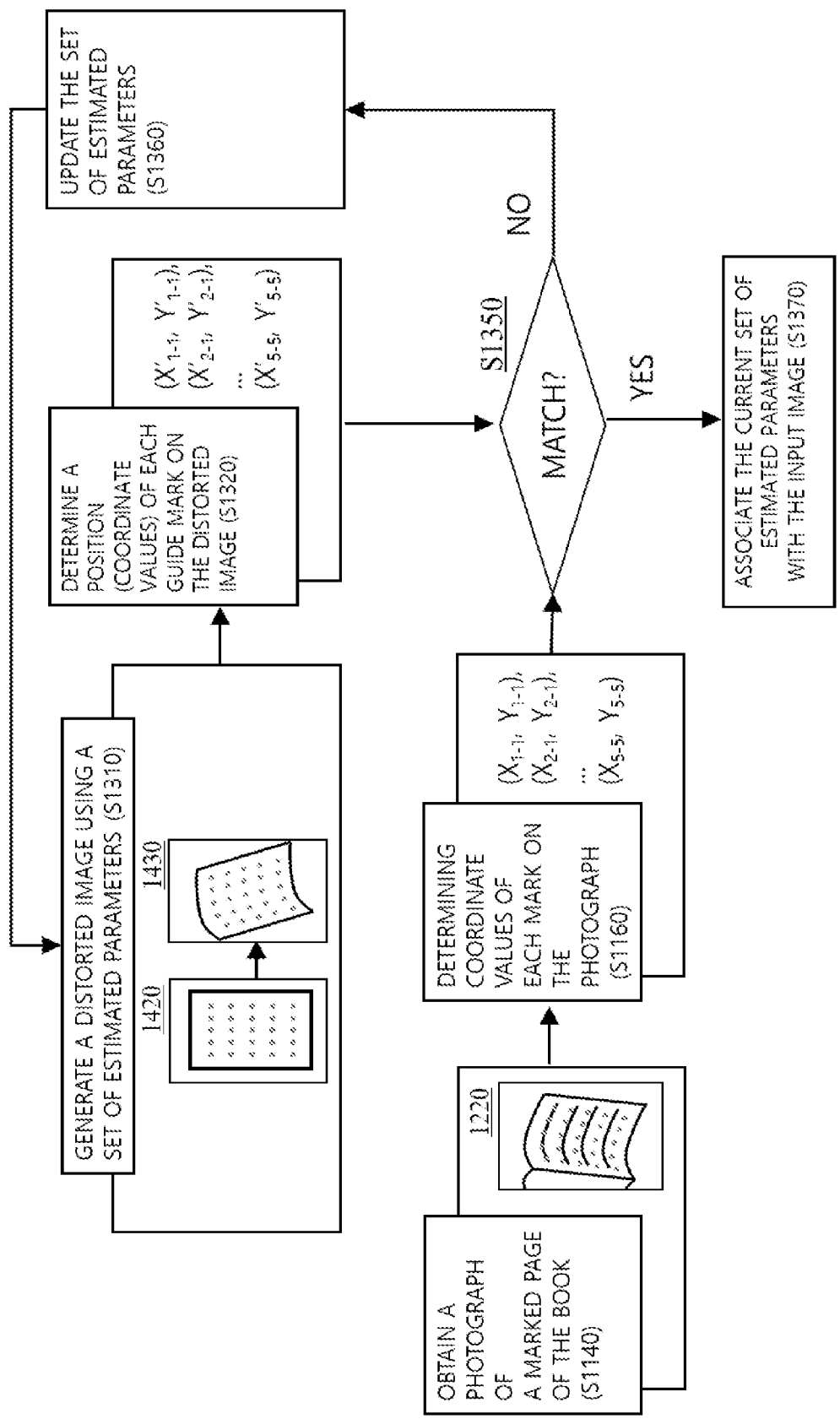

BOOK SCANNING USING MACHINE-TRAINED MODEL

BACKGROUND

Some book readers want to digitally store contents of books. There are smartphone applications for photographing book pages and digitally storing them. Bounded book pages are often curled or arched when they are open. Photographing curled or arched book pages may result in curved text lines on the photograph.

SUMMARY

According to an aspect of the present disclosure, a method of preparing an input-output data pair to train a machine-trainable model for use in digitally storing contents of a book is presented. The method comprises:
providing a markings page as part of a bound book, the markings page comprising texts for carrying information and a plurality of markings thereon, wherein each of the plurality of markings is located at a 2D location on the markings page when it is unbound and flat;
providing the 2D location for each of the plurality of markings of the markings page;
opening the bound book to provide an open state of the markings page of the bound book in which the markings page is curled as opposed to being flat;
capturing, using a camera, a photographic image of the markings page in the open state, wherein the markings page appearing on the photographic image is distorted from when the markings page is unbound and flat at least due to curling of the markings page in the open state, due to a 3D camera location relative to the markings page, and further due to a 3D camera orientation relative to the markings page, wherein each of the plurality of markings is located at a distorted 2D location on the photographic image;
processing the photographic image to obtain the distorted 2D location for each of the plurality of markings; and
computing a set of parameters that represent the markings page distorted on the photographic image, wherein the set of parameters comprises:
  a first subset of parameters relating to a 3D camera location relative to the markings page,
  a second subset of parameters relating to a 3D camera orientation of the camera relative to the markings page, and
  a third subset of parameters relating to curling of the markings page in the open state,
In the method, computing the set of parameters involves a process of iteration comprises:
assigning values to the first, second and third subsets of parameters,
computing, using the assigned values, a distorted 2D location for each of the plurality of markings on a distorted image that would be obtained by curling the markings page from when it is unbound and flat according to assigned value(s) to the third subset and by taking a photographic image of the curled markings page using a camera located at a 3D camera location relative to the markings page according to assigned value(s) to the first subset and in a 3D camera orientation relative to the markings page according to assigned value(s) to the second subset;
computing a loss representing a difference between the distorted 2D locations computed using the assigned values and the distorted 2D locations obtained by processing the photographic image;
comparing the loss to a predetermined threshold value to determine if the loss is equal to or smaller than the predetermined threshold value;
when it is determined that the loss is greater than the predetermined threshold value, assigning updated values to the set of parameters; and
repeating a sequence of computing a distorted 2D location, computing a loss, comparing the loss, and assigning updated values until the loss is equal to or smaller than the predetermined threshold value.

The method further comprises, upon determining that the loss is equal to or smaller than the predetermined value, associating the currently assigned values that have led to the loss equal to or smaller than the predetermined threshold value with the photographic image of the markings page or a modified version thereof such that the photographic image of the markings page or the modified version thereof is an input of the input-output data pair and the currently assigned values are output data of the input-output data pair.

In an implementation, the method comprises associating the currently assigned values with the modified version of the photographic image of the markings page, wherein the method further comprises removing at least one of the plurality of markings from the photographic image to obtain the modified version.

In an implementation, wherein the method comprises associating the currently assigned values with the modified version of the photographic image of the markings page, wherein the modified version comprises a lower resolution version of the photographic image in which texts are illegible.

In an implementation, computing the distorted 2D location for each of the plurality of markings does not involve actually generating the distorted image.

In an implementation, the markings page comprises one or more additional markings for which the 2D locations thereof are not provided, wherein a distorted 2D location is not computed for the one or more additional markings.

In an implementation, the third subset of parameters includes two parameters representing a Bezier Curve.

In an implementation, the set of parameters further comprises at least one page size parameter representing a size of the markings page in a flattened image that would be obtained by dewarping the photographic image of the markings page or a modified version thereof. Further in an implementation, the at least one page size parameter represents a relative size of the markings page in the flattened image relative to a size of the whole flattened image.

In an implementation, the photographic image of the markings page is captured such that four corners of the markings page are included in the captured photographic image, wherein the plurality of markings are substantially identical in shape and size.

In an implementation, the distorted 2D location for each of the plurality of markings on the distorted image is computed without actually generating the distorted image as an image file.

In an implementation, in computing the distorted 2D location for each of the plurality of markings, the distorted image corresponds to a photographic image of the markings page taken by a pinhole camera located at the 3D camera location relative to the markings page according to assigned value(s), wherein the pinhole camera has an intrinsic parameter matrix of $$\begin{bmatrix} f & 0 & x_o \\ 0 & f & y_o \\ 0 & 0 & 1 \end{bmatrix},$$

where f is a focal length of the pinhole camera, and $x_o$ and $y_o$ are offset parameters representing translations of the origin of imaging pixels of the pinhole camera relative to the pinhole of the pinhole camera.

In an implementation, at least one of the first subset of parameters defining the 3D camera location represents the pinhole camera's translations along an optical axis of the pinhole camera relative to the markings page, and further represents the focal length f of the pinhole camera such that the model does not provide a separate parameter representing the focal length f other than the set of parameters. Further in implementation, the photograph has a width of $w_i$ and a height of $h_i$, and $x_o$ is the half of the photograph width $w_i$ and $y_o$ is the half of the photograph height $h_i$.

According to an aspect of the present disclosure, a method of preparing a machine-trained model. Preparing a machine-trained model comprises generating a plurality of input-output data pairs according to the method above; and training a machine-trainable model using the plurality of input-output data pairs to provide a machine-trained model such that the machine-trained model is configured to generate values for the set of parameters in response to an input of an image of an opened book page.

According to an another aspect of the present disclosure, a method of flattening a book page image, the method comprises:
  capturing an image of an opened book using a camera such that the captured image features a target page of the opened book;
  processing an input image corresponding to the captured image using a machine-trained model to provide a set of parameters for the input image, wherein the set of parameters comprises: a first subset of parameters defining a camera position relative to the target page for capturing the captured image by the camera, a second subset of parameters defining a camera orientation relative to the target page for capturing the captured image by the camera, and a third subset of parameters defining a curvature of the target page; and
  flattening the captured image or a modified image modified from the captured image to provide a flattened image featuring a flattened version of the target page.
  In the method, flattening comprises a data conversion process that uses the set of parameters and corresponds to an opposite of an image distortion process for converting the flattened image to the captured image.
  And, the image distortion process comprises: first data processing corresponding to curling of the flattened image to conform to the curvature defined by the third subset of parameters, which provides a curled version of the flattened image, and second data processing corresponding to taking a photograph of the curled version of the flattened image at the camera position defined by the first subset and in the camera orientation defined by the second subset.

In an implementation, the third subset of parameters defines a curved line indicative of the curvature of the target page. Further in an implementation, the third subset of parameters includes two parameters representing a Bezier Curve.

In an implementation, the method further comprises processing the captured image to generate the input image, wherein the input image is in a predetermined resolution lower than that of the captured image.

In an implementation, at least one text character legible in the captured image is illegible in the input image. Further in an implementation, the at least one text characters is smaller than 3×5 pixels in the captured image.

In an implementation, wherein the set of parameters further comprises at least one page size parameter representing a size of the target page in the flattened image relative to the flattened image. Further in an implementation, the method further comprises: trimming, from the flattened image, a background other than the flattened version of the target page to obtain an output image, wherein the background is, in the flattened image, outside an area defined using the at least one page size parameter.

According to an aspect of the present disclosure, a method of flattening a book page image is disclosed. The method comprises
  capturing, using a camera, an image of a bowed page in an opened book to provide a captured image featuring the bowed page;
  processing an input image corresponding to the captured image using a machine-trained model to provide a set of parameters for relating between a flat surface and a curvature corresponding to the bowed page such that the set parameters is to convert from the flat surface to the curvature or from the curvature to the flat surface; and
  flattening, using the set of parameters, the captured image or a modified version thereof to provide a flattened image featuring a flattened version of the bowed page.
  In the method, wherein flattening comprises a data conversion process that uses the set of parameters and corresponds to an opposite of an image distortion process for converting the flattened image to the captured image, wherein the image distortion process comprises data processing that corresponds to curling the flattened image to conform to the curvature defined by the set of parameters.

In an implementation, the curvature comprises a curved surface. In an implementation, the set of parameters defines the curvature by defining a curved line corresponding a bowed edge of the bowed page. Further in an implementation, the set of parameters includes two parameters representing a Bezier Curve. Further in an implementation, the curved surface is defined using a curved line.

In an implementation, the method further comprises processing the captured image to generate the input image, wherein the input image is in a predetermined resolution lower than that of the captured image. Further in an implementation, at least one text character legible in the captured image is illegible in the input image. Further in an implementation, wherein the at least one text characters is smaller than 3×5 pixels in the captured image.

In an implementation of the method, the set of parameters further comprises at least one page size parameter representing a size of the flattened version of the bowed page in the flattened image relative to the flattened image. Further in an implementation, the method comprises trimming, from the flattened image, a background other than the flattened version of the bowed page to obtain an output image, wherein the background is, in the flattened image, outside an area defined using the at least one page size parameter.

In an implementation, where the set of parameters is referred to as a first set of parameters, processing the input image using the machine-trained model provides a second set of parameters in addition to the first set of parameters, and the second set of parameters is to define a camera position relative to the bowed page for capturing image by the camera. Further in an implementation, processing the input image using the machine-trained model provides a third set of parameters in addition to the first set of parameters and the second set of parameters, and the third set of parameters is to define a camera orientation relative to the bowed page for capturing the captured image by the camera. Further in an implementation, the data processing corresponding to curling the flattened image provides a curled version the flattened image. Further in an implementation, the image distortion process further comprises data processing that corresponds to taking a photograph of the curled version of the flattened image at the camera position defined by the second set of parameters and in the camera orientation defined by the third set of parameters.

BRIEF DESCRIPTION OF THE DRAWINGS

FIG. 13 is a flowchart of an iterative process for providing image correction parameters according to an implementation.

FIG. 14 illustrates a process of determining an input-output data pair according to an implementation.

DETAILED DESCRIPTION

Figure 1:
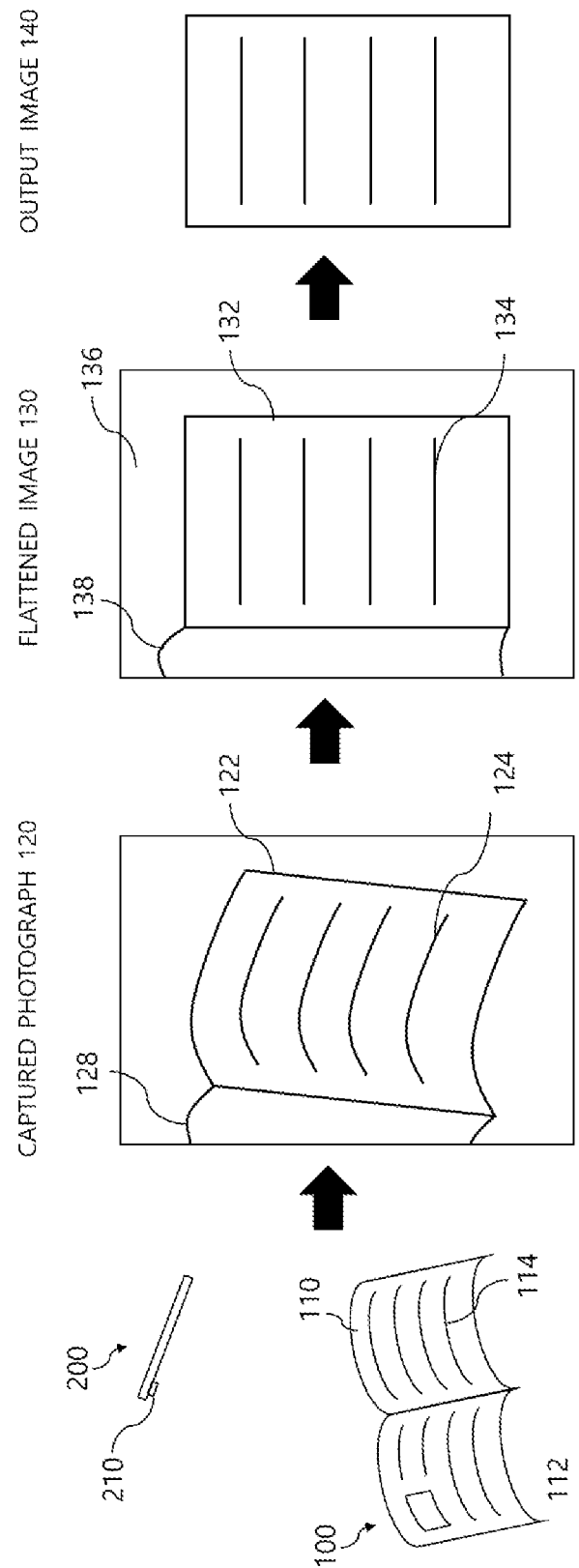
FIG. 1 illustrates an image flattening process of a book page photograph according to an implementation.

Hereinafter, implementations of the present invention will be described with reference to the drawings. These implementations are provided for better understanding of the present invention, and the present invention is not limited only to the implementations. Changes and modifications apparent from the implementations still fall in the scope of the present invention. Meanwhile, the original claims constitute part of the detailed description of this application.

Need for Flattening an Opened Book Page

Sometimes book readers want to digitally store images of physical books. One way is to photograph individual book pages. When photographing pages of an opened book, photographed pages are often curved and texts are distorted. There are many mobile applications for photographing documents and digitally modifying the photographs. However, many such mobile applications do not effectively address distortion of texts on the photographed pages.

Flattening Opened Book Page

This application discloses a technology for flattening a photographed page of a book and straightening texts thereon. The technology uses one or more mathematical models to represent a curved shape of the photographed page. The technology also uses one or more photographic image processing techniques to flatten or dewarp the photographed page using certain parameters related to the curved shape.

Use of Artificial Intelligence

The technology uses one or more machine-trained models to obtain parameters for use in a dewarping or flattening process of the photographed page. A machine-trained model of the technology is configured to, in response to an input of data of a photographic image, output parameters for use in a dewarping or flattening process of the photographic image.

Data Set for Training Machine-Trainable Model

To prepare the machine-trained model, the technology first develops and prepares a data set for training of a machine-trainable model. The training data set includes a number of data pairs. Each pair includes input data for the training machine-trainable model and desirable output data (label) from the model in response to the input data. For example, the input data is an image of a curved book page, and the desirable output data includes one or more parameters for use in obtaining a flattened image featuring a flat version of the curved book page.

Training of Machine-Trainable Model

The technology can use various training techniques to obtain a machine-trained model having a desirable performance. For example, training of a model is completed when, for each of input data of the training data set, output from the model is within a predetermined allowable range of error from the corresponding desirable output data (label) of the training data set.

Image Flattening Using Mobile Application

Once the machine-trained model is prepared, the machine-trained model is included in a computer program, e.g., a mobile application for a smartphone. When a user takes a photograph of a page of an opened book, the mobile application uses the machine-trained model to obtain a set of image correction parameters, and processes the photograph to generate a flattened image of the photographed page using the set of image correction parameters. The flattened image features straightened texts of the photographed page.

Process to Obtain Flattened Book Page Images

Figure 2:
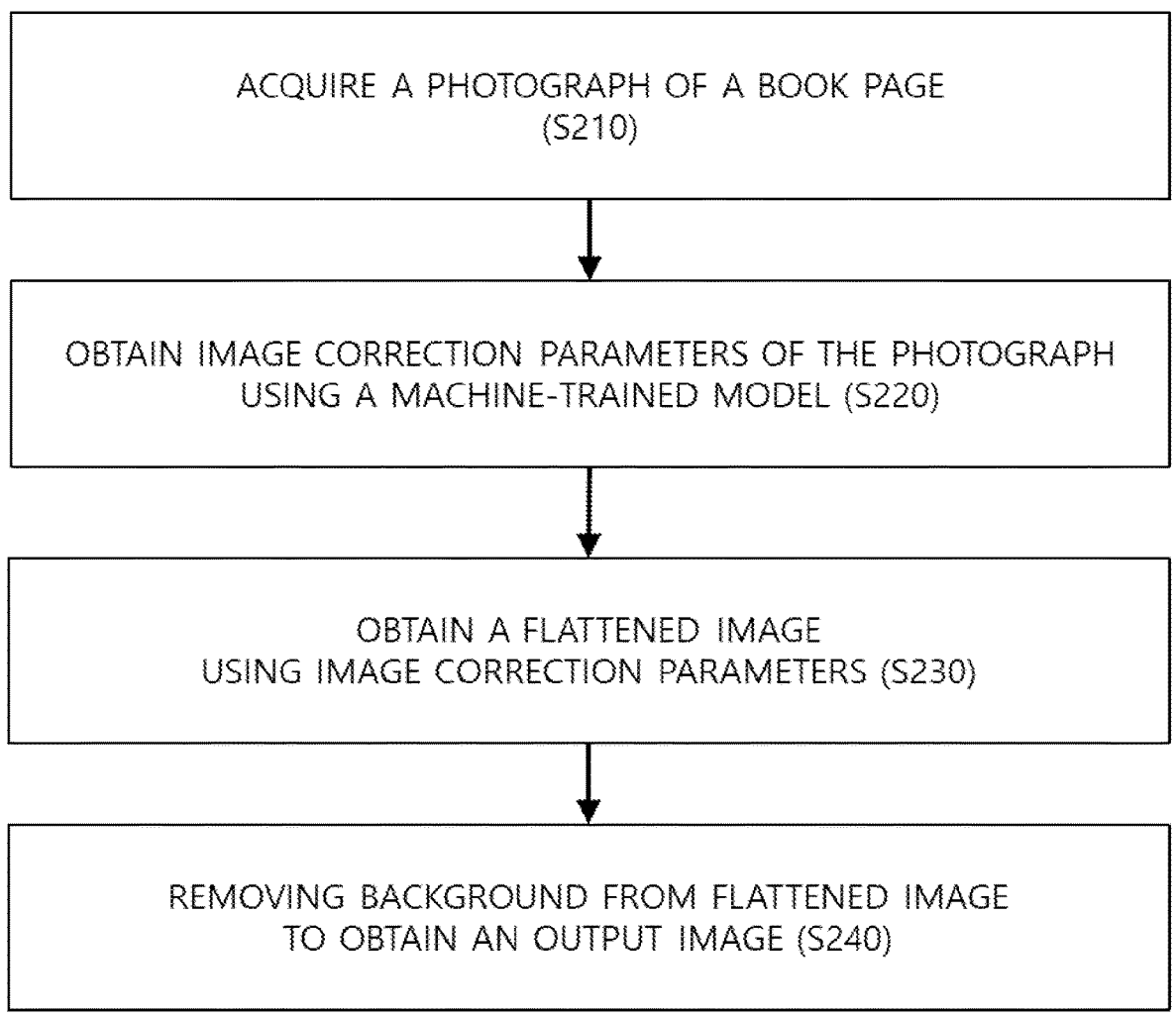
FIG. 2 is a flowchart of the image flattening process of FIG. 1 according to an implementation.

FIGS. 1 and 2 illustrate a process of flattening a book page according to an implementation of the invention. First, at step S210, a photograph 120 of a book page 110 is acquired. Subsequently, at step S220, the photograph 120 is processed using a machine-trained model to obtain a set of image correction parameters. Then, at step S230, a flattened image 130 of the book page is generated using one or more of the sets of image correction parameters. Then, at step S240, a background 136 is removed from the flattened image 130 to obtain an output image 140 that represents a flat status of the book page 110.

Acquiring Photograph of Opened Book Page

Referring to FIG. 1, a book 100 is open to show a target page 110 and an additional page 112. A user takes a photograph 120 of the target page 110 using a camera 210 of a smartphone 200. In the alternative, the user may retrieve a photograph from a local data store of the smartphone 200 or a remote data store for further processing.

Texts in Photograph

The target page 110 illustrates text lines 114 which are not actual lines but represent arrangements of texts. The photograph 120 is large and clear enough such that characters are legible in the photograph 120. For example, the photograph 120 is a color photograph having a resolution of 4096×3072 and 8-bit of color depth for each of red, green and blue (RGB) channels. In embodiments, the photograph 120 may have one or more specifications different from the example size or the example color depth.

Distortions in Photograph

Typically, before being bound to the book, the target page 110 has a rectangular shape, and texts are aligned along straight, parallel, invisible lines on the page. However, when the book 100 is open, the target page 110 may be curved (curled or arched) depending upon its binding. Accordingly, the target page 122 in the captured photograph 120 may be distorted from its original flat rectangular shape as illustrated. The arrangement of the texts, i.e., text lines 124 in the photograph 120 are curved accordingly.

Parameters to Define Distortions

The distortions in the photograph 120 may be defined by various distortion parameters. For example, one may define the page distortions in the photograph using (1) physical bending or warping of the target page 110 due to the book's binding, (2) the camera's position and orientation relative to the target page 110 when the photograph was taken, and (3) the camera's optical characteristic (for example, lens aberrations). One or more additional parameters may contribute to the page's distortion in the photograph 120.

Image Correction Parameters

The photograph 120 may be flattened using the distortion parameters to generate the flattened image 130. As the page's distortion is corrected, the flattened image 130 features a flattened version of the page 132 (flattened page) and texts are aligned along straight lines 134 in the flattened page. In an implementation, one or more parameters that are not directly related to or contributed to the page's distortion can be used for the image flattening process. How to define and obtain image correction parameters is discussed later in more detail.

Possible Direct Measurement of Image Correction Parameters

For example, the smartphone may use the camera's focusing mechanism to measure the camera's distance to a point of the target page 110. If the smartphone 200 has a 3D scanning system separate from the camera 210, it may directly measure the page's curved shape and obtain one or more image correction parameters representing the page's curved shape. As such, the smartphone 200 may use one or more sensors to obtain an image correction parameter directly without referencing to the photograph 120. However, in an implementation, the smartphone 200 cannot or does not directly measure one or more image correction parameters.

Indirect Acquisition of Image Correction Parameters from Photograph

When the smartphone is not capable of directly measuring one or more image correction parameters, the smartphone 200 obtains the one or more image correction parameters indirectly from processing of the photograph 120. For example, (1) an iterative estimation and (2) a machine-trained model can be used to obtain one or more parameters from the photograph 120. In the alternative, one or more analysis techniques can be used to obtain an image correction parameter from the photograph.

Iterative Estimation May not Impractical for Smartphone

The smartphone 200 may obtain one or more image correction parameters from the photograph 120 using an iterative estimation. In such an iterative estimation, one or more image correction parameters can be determined by repeating (1) evaluating a set of estimated parameters using one or more predetermined criteria and (2) update one or more in the set of estimated parameters based on the evaluation, until the one or more predetermined criteria are satisfied. For example, the smartphone 200 (a) generates a corrected version of the photograph 120 using a set of estimated image correction parameters, (b) evaluates if texts are aligned along straight lines in the corrected version, and (c) updates at least one of the set of estimated image correction parameters based on the evaluation until and repeating the generation step (a) and the evaluation step (b) until finding a set image correction parameters that makes text lines straight in the corrected version. However, performing such an iterative estimation on the smartphone 200 may not be desirable when it takes a long time (e.g. more than 1 second) to reach a final estimation due to the smartphone's limited computational power and when time to reach a final estimation varies significantly among different photographs.

Machine-Trained Model

Figure 3:
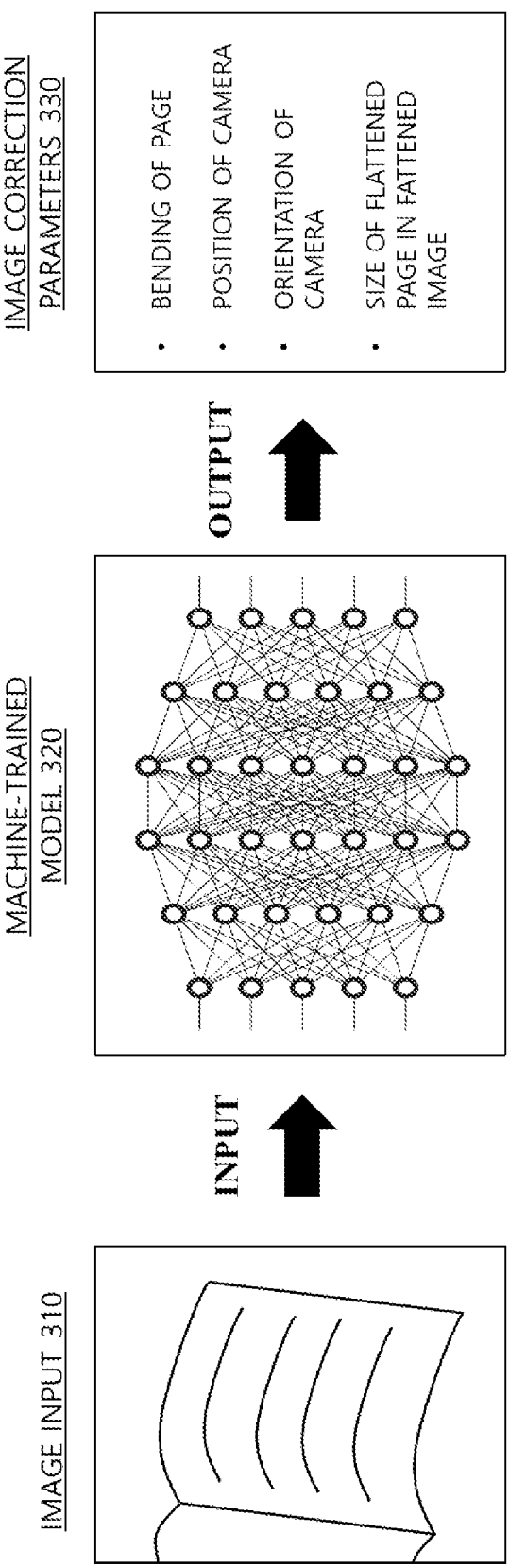
FIG. 3 illustrates a process to obtain image correction parameters from a photograph of an opened book page or an image input representing the photograph according to an implementation.

The smartphone 200 may run a machine-trained model 320 to obtain one or more image correction parameters from the photograph 120. Referring to FIG. 3, the machine-trained model 320 receives an image input (input image) 310 corresponding to the photograph 120. The input image 310 can be the photograph 120 itself, an equivalent, or a modified version of the photograph 120. In an implementation, the machine-trained model 320 receives an additional input other than the input image 310. The machine-trained model processes the input image 310 and outputs image correction parameters 330 for use in generating the flattened image 130.

Input Image of Machine-Trained Model

In an implementation, for example, the input image 310 has a resolution of 192×144 and three color channels of red, green and blue (RGB) while the photograph has a resolution of 3200×2400 and has RGB) channels. As such, the number of pixels in the input image 310 can be less than 1 percent of the number of pixels in the photograph. Using a smaller resolution for the input image 310 can be advantageous to reduce the numbers of internal parameters of the machine-trained model 320 and thereby to reduce an amount of computation for obtaining the image correction parameters.

As the machine-trained model 320 requires the input image 310 to satisfy a predetermined specification (the same specification as input images used for training the model), the photograph 120 is processed into the input image 310. The predetermined specification for the input image 310 may be different from the example, and may define one or more of pixel resolution, image format, and color channel.

Illegible Text in Small Input Image

When the photograph 120 is reduced to the input image 310 having, for example, a resolution of 192×144, characters printed on the target page 110 may not be legible or individually recognizable in the input image 310. For example, a legible character having a size of 30×30 pixels in the photograph 120 (having a resolution of 3200×2400, for example) becomes illegible to a human eye in the input image 310 when the character gets smaller than a minimum legible size (for example, 3×5 pixels) in the input image 310 having a resolution of 192×144.

However, the machine-trained model 320 does not need legible characters to output image correction parameters. Regardless of whether texts are legible in the input image 310, the machine-trained model 320 outputs image correction parameters good enough to correct the page's distortion in the photograph 120 and to obtain a rectangular page 132 (flattened page) of the flattened image 130.

Output of Machine-Trained Model

Referring to FIG. 3, the machine-trained model's output 320 includes at least one of the following image correction parameters: (1) one or more parameters representing the page's physical bending (the page's curvature), (2) one or more parameters representing the camera's position relative to the target page 110, (3) one or more parameters representing the camera's orientation relative to the target page 110, and (4) one or more parameters representing a size of the flattened page 132 in the flattened image 130. In an implementation, the machine-trained model 320 may output one or more additional parameters.

Example output parameters of the machine-trained model 320 are described in more detail with reference to FIGS. 4A-8. An example process to prepare the machine-trained model 320 is described in more detail later with reference to FIGS. 9-14.

Image Correction Parameter—Page Bending Parameter

Figure 4A:
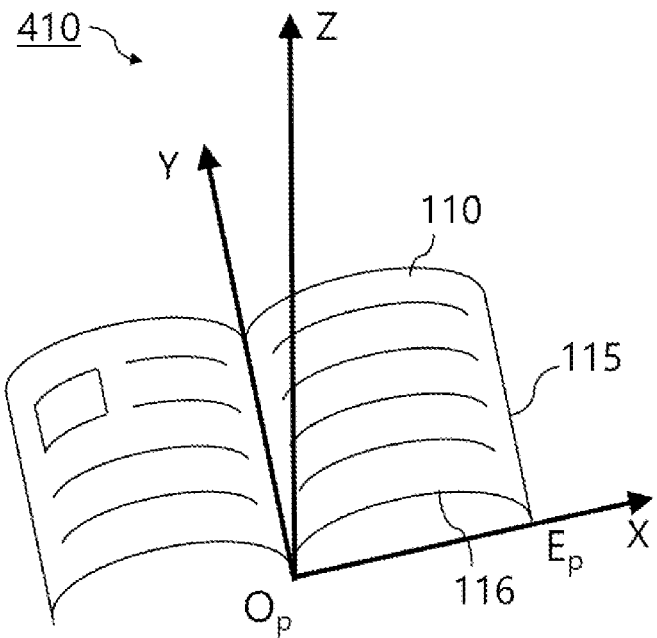
FIGS. 4A and 4B illustrate a mathematical model to represent a curvature of an opened book page according to an implementation.
Figure 4B:
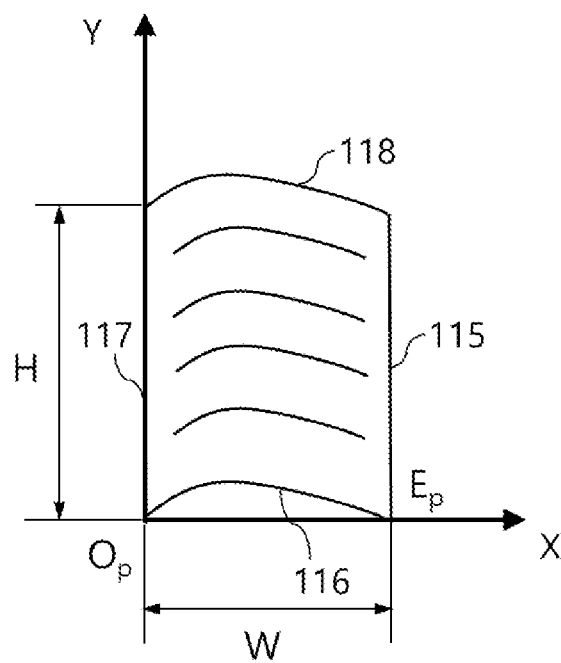

In an implementation, the machine-trained model 320 outputs one or more parameters representing the page's bending (the page's curvature). To describe the page's bending with a limited number of parameters, a mathematical model is used in combination with one or more assumptions. FIGS. 4A and 4B illustrate a mathematical model to represent a curvature of an opened book page according to an implementation.

Parameter for Conversion Between Flat Surface and Curvature

In an implementation, the machine-trained model processes an input image data corresponding to the captured photograph 120 and outputs one or more parameters for relating between a flat surface (flat page) and a curvature corresponding to a bowed book page 122. The one or more parameters are to convert the flat surface to the curvature or to convert the curvature to the flat surface.

Curved Page Fits Cylindrical Surface

In an implementation, the page 110 is assumed to be a rectangular page when flat. It is also assumed that the page 110 curls from its flat rectangular shape to fit a cylindrical surface shown in FIG. 4B. The page's right edge 115 and left edge 117 are parallel to each other. The bottom edge 116 and the top edge 118 are of the same curved line and parallel to each other. In another implementation, one or more assumptions different from the example can be used for modeling of the page's curvature.

Coordinate System to Describe Page Curvature

Figure 5:
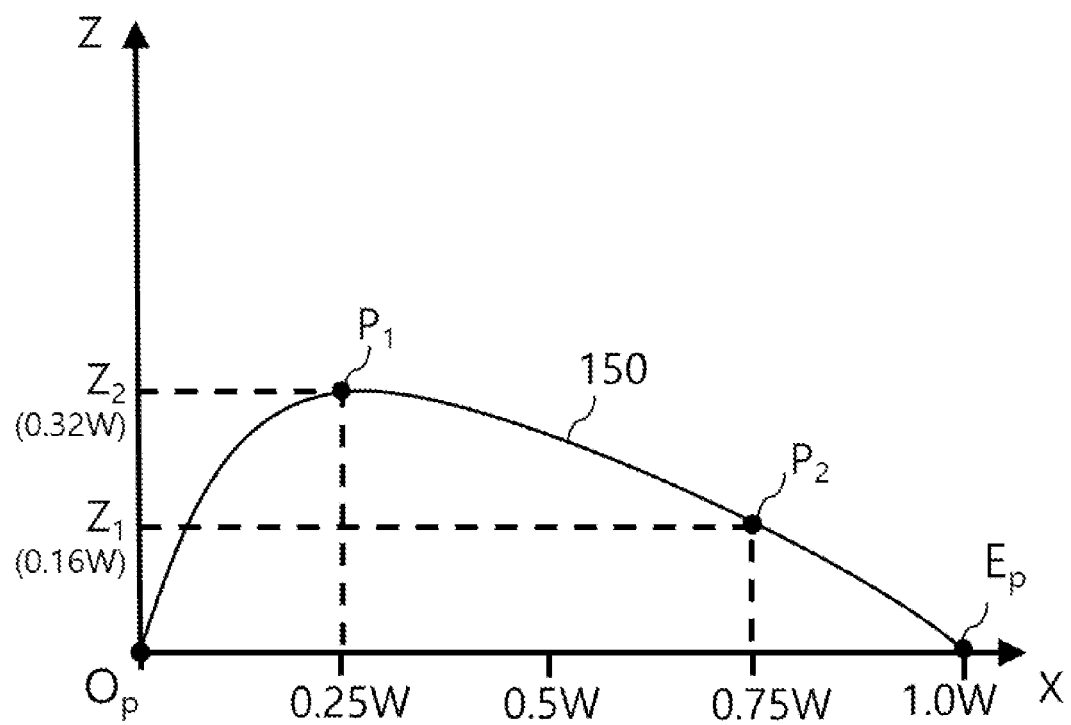
FIG. 5 illustrates a Bezier curve model representing a curvature of an opened book page according to an implementation.

Referring to FIGS. 4A, 4B and 5, a page coordinate system 410 (a world coordinate system) is introduced to describe the page's physical bending. The page coordinate system 410 is a Cartesian coordinate system having its origin $O_P$ at the left-bottom corner of the target page 110. The x-axis passes the left-bottom corner $O_P$ and the right-bottom corner $E_P$ of the target page 110. The target page 110 has a width W along the x-axis. The y-axis perpendicular to the x-axis is aligned along the left-side edge 117 of the page. The target page 110 has a height H along the y-axis. The z-axis of the coordinate system extends upward along a direction perpendicular to the x-y plane. In an implementation, a different coordinate system can be used for modeling of a page curvature.

Same Cross-Section of Cylindrical Surface

Referring to FIG. 5, when cross sections of the curved page 110 are taken along a plane parallel to the x-z plane, the cross sections show the same curved line 150 because the curved page 110 forms a cylindrical surface. When the curved line 150 can be presented using a limited number of parameters, the page's curved shape can be represented with the limited number of parameters in combination with the assumption of a cylindrical surface page.

Bezier Curve

In an implementation, the curved line 150 is modeled using a Bezier curve. A Bezier curve may be defined using coordinates of its control points. Referring to FIG. 5, the curved line 150 can be defined using coordinates of the four control points ($O_p$, $P_1$, $P_2$, and $E_p$). In the alternative, when using a different order Bezier curve, a different number of control points are needed to define the curved line 150. A higher order Bezier curve needs a greater number of control points to define it. In the alternative, a curved line other than a Bezier curve may be used for modeling of the page's curved shape. For example, a parametric curved line can be used.

Relative Scale to Page Width

In representing the curved line 150 with the coordinates of the four control points ($O_p$, $P_1$, $P_2$, and $E_p$), the coordinates can be in a relative scale to the page width W. In a relative scale to the page width W, the coordinates of the origin $O_p$ and the right-bottom corner $E_p$ are fixed as (0, 0) and (0, 1) respectively. Accordingly, to define the curved line 150, we need only the coordinates for the other control points ($P_1$, $P_2$). In the alternative, a different scale can be used for the coordinates of the control points.

Two Parameters for Bezier Curve

When we set x-coordinates of the points $P_1$, $P_2$ to ¼ and ¾ of the page width W, further to using a relative scale to the page width W, the Bezier curve line 150 can be represented using only two coordinate values (parameters), z-axis coordinates $Z_1$ and $Z_2$ of the two points $P_1$, $P_2$ in a relative scale to the page width W. Referring to FIG. 5, the two parameters representing the Bezier curve line 150 are 0.16 and 0.32 with the assumptions and conditions discussed. In the alternative, if we use one or more different assumptions and conditions, the page's curved shape may be represented using only one parameter or using more than two parameters.

Camera Parameters Affecting Page's Curved Shape in Photograph

The photographed page's curved shape in the photograph 120 is affected by one or more parameters of the camera 210. The camera parameters include one or more intrinsic parameters (focal length, skew, offset) and one or more extrinsic parameters (camera rotation, camera translation). In an implementation, the machine-trained model 320 outputs one or more of the camera parameters for use in the image correction of the photograph 120. Example camera parameters are explained in detail with reference to FIGS. 6, 7A and 7B.

Coordinate System

Figure 6:
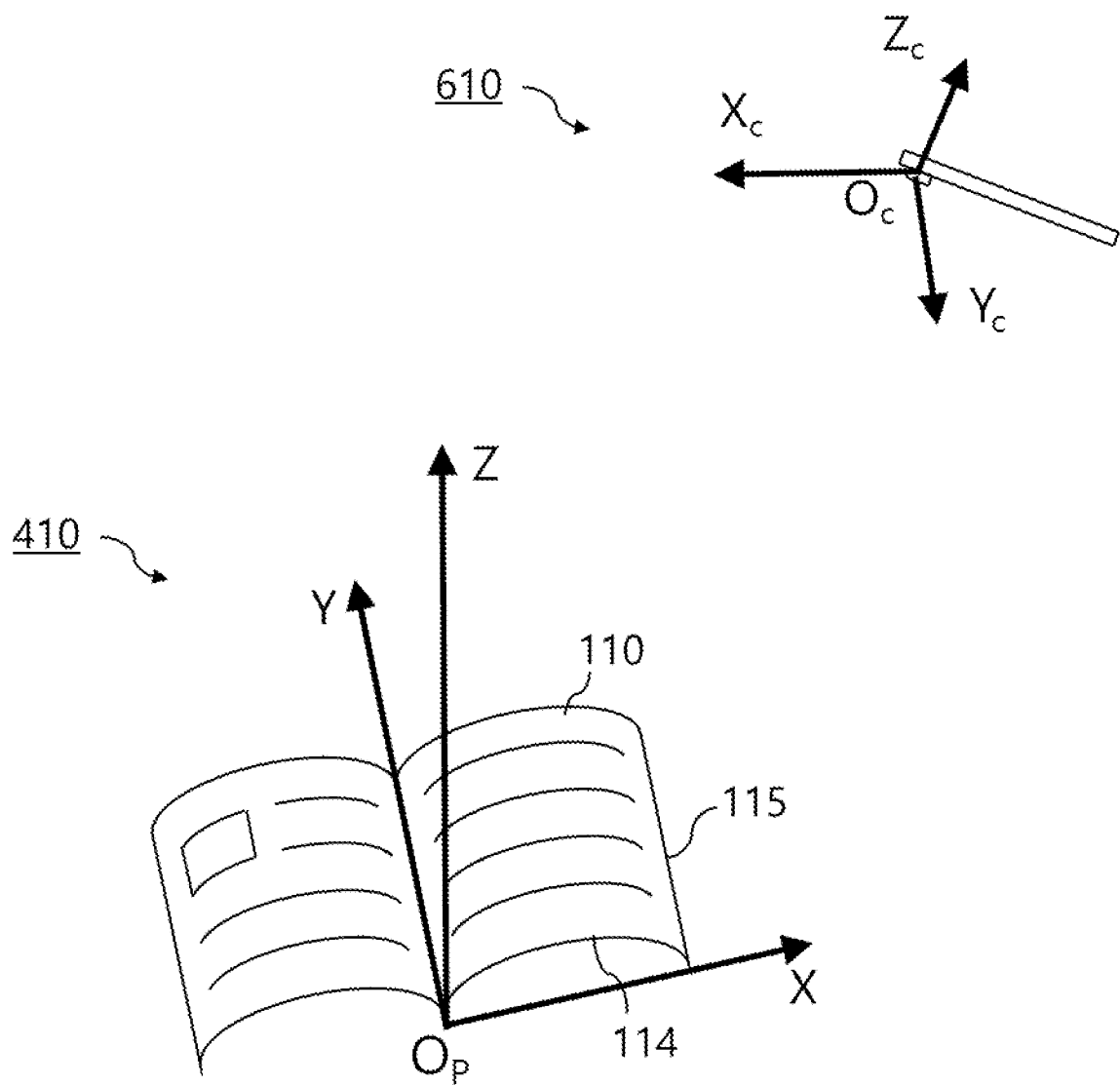
FIG. 6 illustrates a camera's position and orientation relative to the opened book page at the time of taking a photograph of the page according to an implementation.

FIG. 6 illustrates a camera's position and orientation relative to the book page 110 at the time of taking a photograph of the page. Referring to FIG. 6, the camera's position (camera translation) and orientation (camera rotation) relative to the book page 110 can be defined using a camera coordinate system 610 in addition to the page coordinate system 410 explained in connection with FIGS. 4A, 4B and 5. The camera coordinate system 610 is a Cartesian coordinate system having three axes $x_c$, $y_c$, $z_c$. The $z_c$-axis is aligned with an optical axis of the camera 210. The $x_c$-axis and $y_c$-axis are perpendicular to the $z_c$-axis, and the $x_c$-$y_c$ plane is parallel to an image plane ($x_i$-$y_i$) of an image coordinate system 710 of the camera 210.

Pinhole Camera Model

Figure 7A:
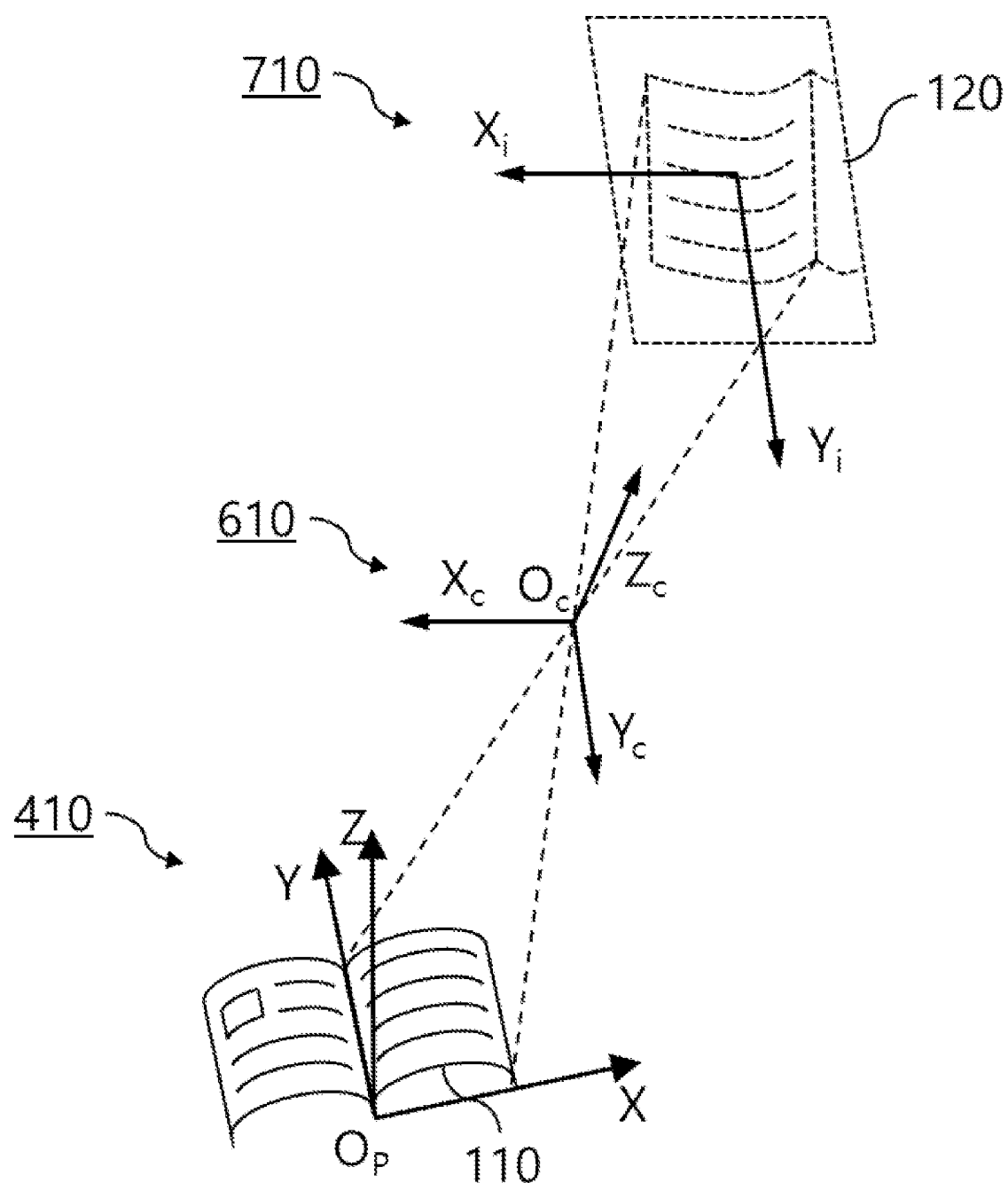
FIG. 7A illustrates a pinhole camera model of taking a photograph according to an implementation.
Figure 7B:
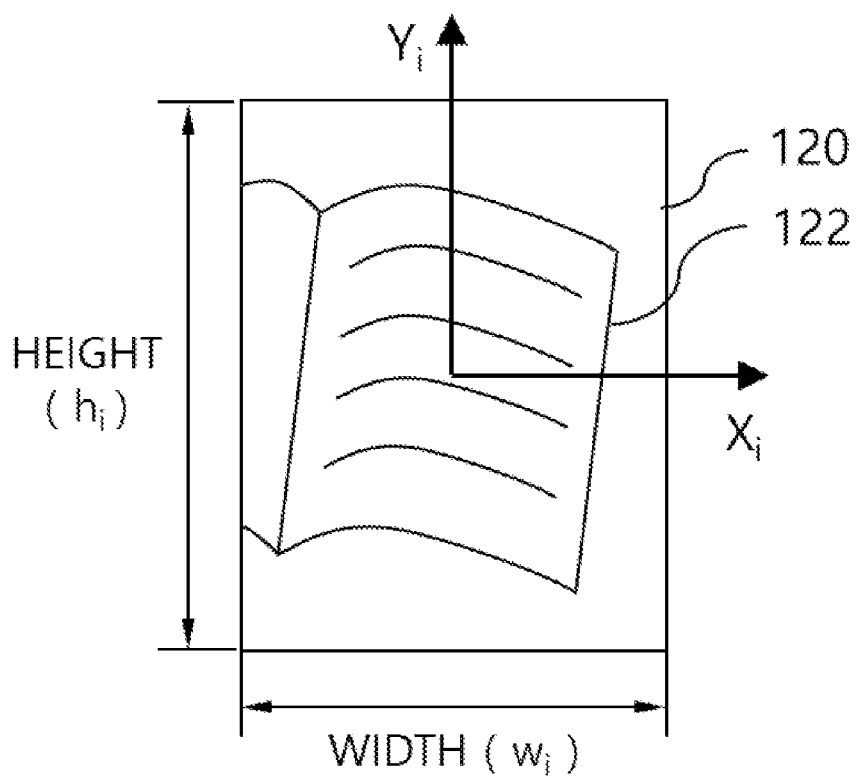
FIG. 7B illustrates a photographic image of an opened book page by the pinhole camera model of FIG. 7A according to an implementation.

FIG. 7A illustrates a pinhole camera model of taking the photograph 120. FIG. 7B illustrates the photograph 120 on an image plane of the pinhole camera model of FIG. 7A. According to the pinhole model of FIG. 7A, the camera's pinhole is located at the camera coordinate origin $O_c$. Light rays from the book page 110 pass through the pinhole and form the photograph 120 on the image plane ($x_i$-$y_i$ plane) where the unit of measure is pixel.

Ideal Pinhole Camera Model

A matrix of camera intrinsic parameters is $$\begin{bmatrix} f_x & s & x_o \\ 0 & f_y & y_o \\ 0 & 0 & 1 \end{bmatrix},$$

where $f_x$ and $f_y$ are focal lengths in pixel units, s is a skew parameter (skew coefficient) representing distortion of non-rectangular pixels, and $x_o$ and $y_o$ are offset parameters representing translations of the origin of imaging pixels relative to the pinhole.

In an ideal pinhole camera model of FIG. 7A, $f_x$ and $f_y$ have the same value f, and the skew parameter becomes zero, and the offset parameters are known ($x_0$ equals the half of image width $w_i$, and $y_o$ equals the half of image width $h_i$). Accordingly, a focal length f becomes the only intrinsic parameter of the pinhole camera that needs to be estimated/computed in the process. Accordingly, using an ideal pinhole camera model has an advantage to reduce the number of camera's intrinsic parameters that need to be estimated. In the alternative, a camera model other than a pinhole camera model can be used. However, using a model other than an ideal pinhole camera may increase the number of camera parameters to consider and increase complexity of the model 320.

Camera's Orientation Parameter (Camera Rotation)

The machine-trained model 320 outputs one or more parameters representing the camera's orientation relative to the target page 110. In an implementation, the camera's orientation can be represented using three angular parameters—roll, yaw and pitch of the camera 210 in the page coordinate system 410. In an implementation, the camera's orientation relative to the page 110 can be defined using three angles between axes of the page coordinate system 410 and the camera coordinate system 610. A first angle between the x-axis and the $x_c$-axis, a second angle between the y-axis and the $y_c$-axis, and a third angle the z-axis and the $z_c$-axis in combination represent the camera's orientation relative to the page. In the alternative, the camera's orientation can be defined in a way different from the example.

Camera's Position Parameter (Camera Translation)

The machine-trained model 320 outputs one or more parameters representing the camera's position relative to the target page 110. In implementations, the machine-trained model 320 outputs one or more of (1) an x-axis translation $t_x$, (2) a y-axis translation $t_y$, and (3) a z-axis translation $t_z$ of the camera 210 in the page coordinate system 410. In embodiments, the x-axis translation $t_x$, the y-axis translation $t_y$, and the z-axis translation $t_z$ are x, y, z coordinates of the camera coordinate origin $O_C$ in the page coordinate system 410. In implementations, the machine-trained model 320 outputs one or more parameters representing the page's position relative to the camera 200. For example, the machine-trained model 320 outputs one or more of (1) an x-axis translation, (2) a y-axis translation, and (3) a z-axis translation of a point of the target page 110 in the camera coordinate system 610.

Camera Position Parameters

In an implementation, the photograph's size on the camera's image plane ($x_i$-$y_i$ plane) is considered to compute one or more of the camera position parameters from the x-axis translation ($t_x$) and the y-axis translation ($t_y$). For example, the machine-trained model 320 outputs an x-axis translation parameter ($t_{x\_scale}$) defined by the following equation:

$$t_{x\_scale} = \frac{t_x}{w_i/2},$$

where is $w_i$ is the photograph's width in pixels and $t_x$ is the x-axis translation of the camera.

For example, the machine-trained model 320 outputs a y-axis translation parameter ($t_y$ scale) defined by the following equation:

$$t_{y\_scale} = \frac{t_y}{h_i/2},$$

where $h_i$ is the photograph's height in pixels, and $t_y$ is the y-axis translation of the camera.

Camera Focal Length Parameter

In an implementation, the machine-trained model 320 outputs one or more of the camera's parameters. For example, the machine-trained model 320 outputs a focal length parameter ($f_{scale}$) defined by the following equation:

$$f_{scale} = \frac{f}{\max(w_i, h_i)/2},$$

where $w_i$ and $h_i$ are the photograph's width and height in pixel units.

Z-axis Translation and Camera Focal Length Parameter Combined in a Single Parameter According to an ideal pinhole camera model of FIG. 7A, when the optical axis of the pinhole camera coincides the z-axis of the camera coordinate system 610 and when the target page 110 is distanced by a focal length f of pinhole camera from the origin $O_C$, the z-axis translation of the target page 110 can be also represented by the focal length f. Accordingly, when the model 320 uses the focal length parameter ($f_{scale}$) to represent the z-axis translation, no additional parameter representing the z-axis translation of the target page may be necessary, and accordingly the number of parameters necessary to represent the camera's position (x, y, z translations) and the camera's intrinsic parameter(s) in combination can be reduced to three.

Relative Scale for Camera Parameter

In the examples discussed above, the x-axis translation parameter ($t_x$ scale), the y-axis translation parameter ($t_{y\_scale}$) and the focal length parameter ($f_{scale}$) are defined in a relative scale to the photograph's size on the image plane in pixels. Using relative scales for camera parameters is advantageous to accommodate various sizes of photographs for an image flattening process to obtain a flattened image and for training of a machine-trainable model. In the alternative, one or more of the camera parameters can be defined without considering the photograph's size in pixels.

Page Size Ratio

Figure 8:
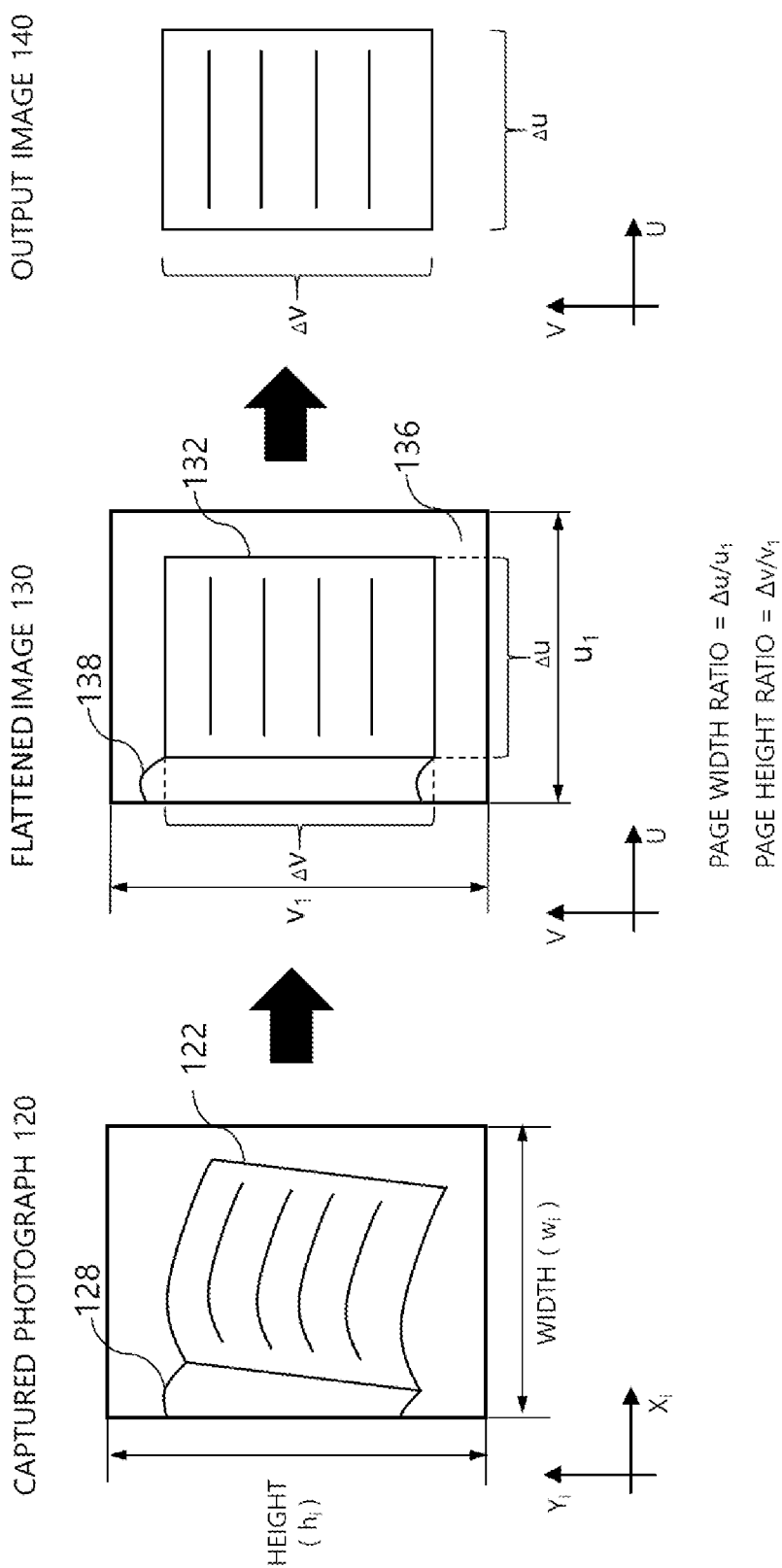
FIG. 8 illustrates a processing of a photograph of an opened book page to obtain an output image and page size ratios for use in the processing according to an implementation.

In embodiments, the machine-trained model 320 outputs one or more parameters representing a size of the flattened page 132 in the flattened image 130. FIG. 8 illustrates page size ratios for use in removing the background 136 from the flattened image 130. According to FIG. 8, the captured photograph 120 includes a partial image 128 of an additional page 112 of the book, and the flattened image 130 includes a modified version 138 of the partial image 128. The machine-trained model 320 outputs one or more of (1) a page width ratio-a ratio of a width $\Delta u$ of the flattened page 132 to a width $u_1$ of the flattened image 130, and (2) a page height ratio-a ratio of a height $\Delta v$ of the flattened page 132 to a height $v_1$ of the flattened image 130 such that the flattened image 130 is trimmed to remove the background based on one or more of the page width ratio and the page height ratio. In certain embodiments, the machine-trained model 320 is configured to output only one page size ratio based on an assumption that the modified version 138 will have a size that makes the page width ratio and the page height ratio the same (and when the model is trained accordingly such that).

No Detection of Page Edge to Remove Background

In embodiments, the flattened page 132 is of a rectangular shape having its sides parallel to the sides of the flattened image 130, and the center of the rectangular flattened page 132 is located at the center of the flattened image 130. Accordingly, when we know the page width ratio and the page height ratio, the background 136 can be removed just by trimming the flattened image 130 based on the ratios without a process to detect an edge of the flattened page 132 in the flattened image 130.

Image Flattening Process

Using one or more of the obtained image correction parameters, an image flattening process of the photograph 120 (or its equivalent) is performed to generate the output image 140. The image flattening process is a computational process to reverse the page's distortion based on one or more mathematical models and assumptions used for defining the image correction parameters (e.g. pinhole camera model, assumption of a Bezier Curve, and assumption that the page width ratio $\Delta u/u_1$ and the page height ratio $\Delta v/v_1$ are the same). In embodiments, the output image 140 can be generated without actually generating or storing the flattened image 130. A person having ordinary skill in the art would be able to configure a computational process of image flattening based on mathematical models and assumptions to define the image correction parameters.

Process to Prepare Machine-Trained Model

Figure 9:
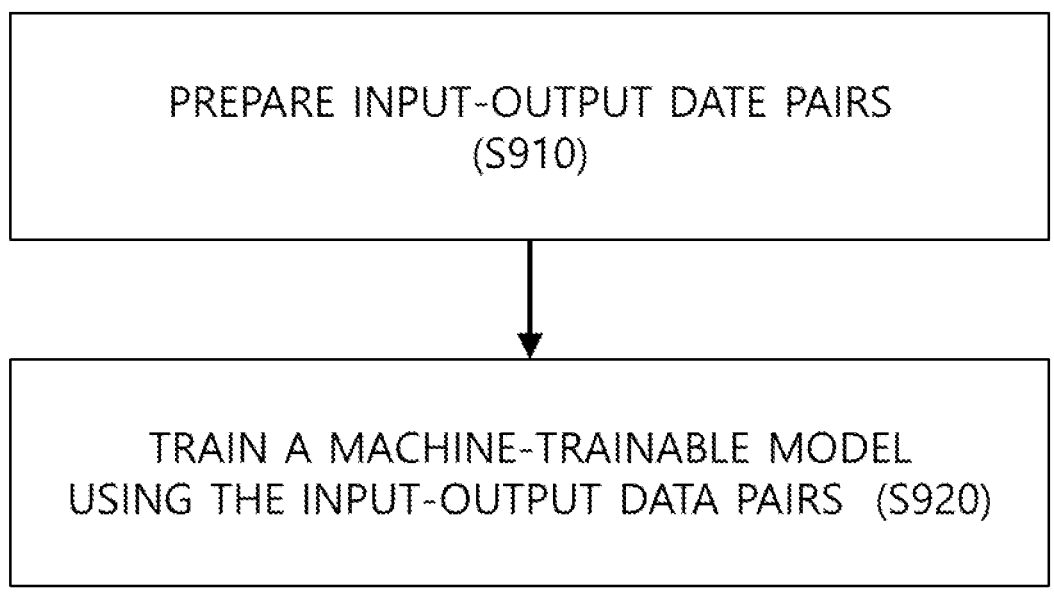
FIG. 9 is a flowchart of developing a machine-trained model according to an implementation.

A process to prepare the machine-trained model 320 is discussed in detail with reference to FIGS. 9-14. FIG. 9 is a flowchart of preparing the machine-trained model 320 according to an implementation. Preparing the machine-trained model 320 includes preparing a set of data for training a machine-trainable model (S910) and training the machine-trainable model using the prepared set of data (S920).

Training Data Set for Supervised Learning

Figure 10:
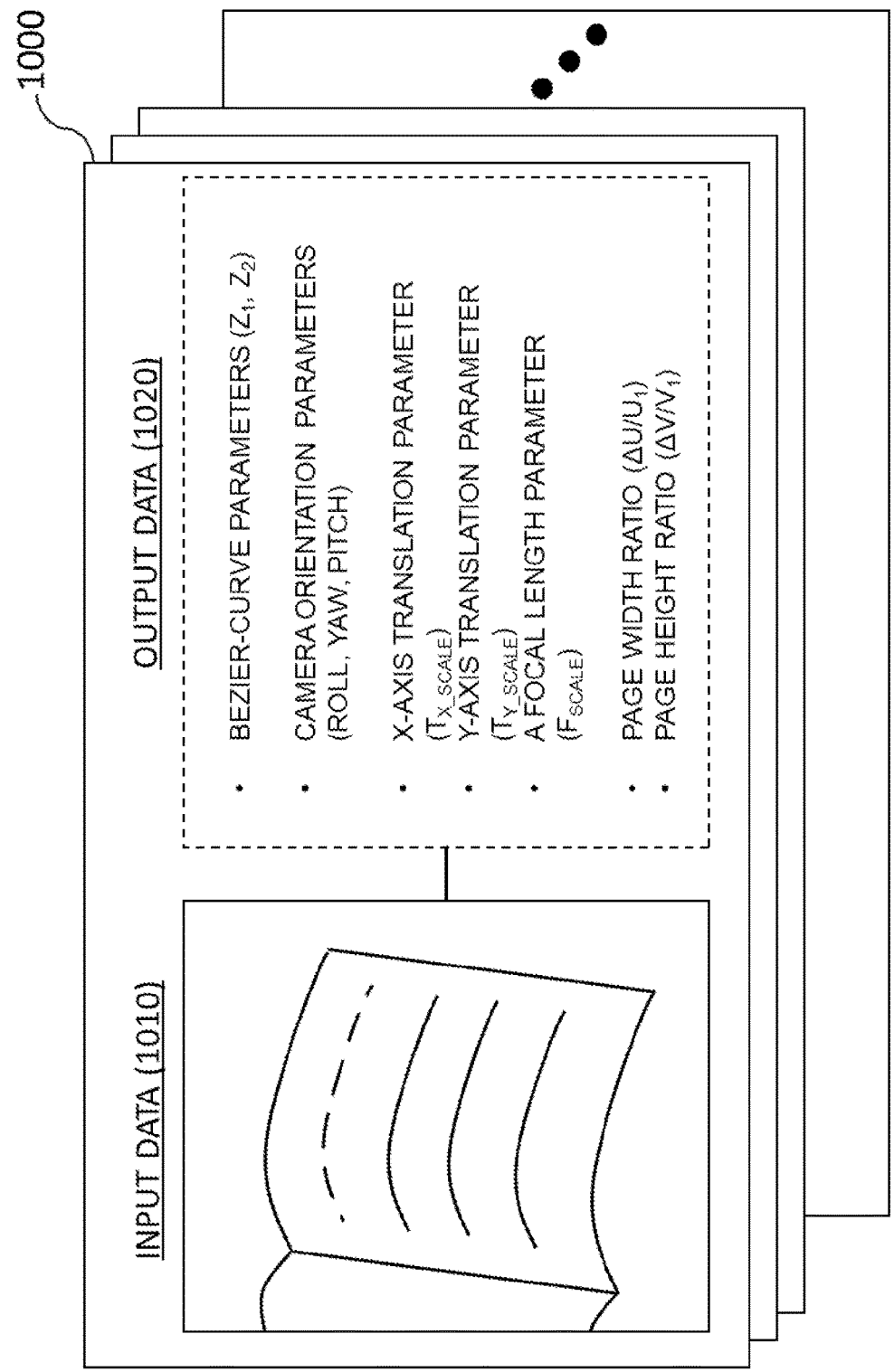
FIG. 10 illustrates input-output data pairs for training a machine-trainable model according to an implementation

FIG. 10 illustrates input-output data pairs for a machine-trained model according to an implementation. Each one of the input-output data pairs includes a training input image and its corresponding output data. An example input-output data pair 1000 includes an input image 1010 featuring a curved book page and output data 1020 corresponding to the input image 1010. The output data 1020 is a desirable output (image correction parameters) of the machine-trained model 320 when the input image 1010 is inputted to the machine-trained model 320.

Training Data Set Size

For example, 100,000 input-output data pairs can be used to prepare and configure the machine-trained model 320. In the alternative, input-output data pairs can be less than 100,000 or more than 100,000.

Process to Prepare Training Data Set (S910)

Figure 11:
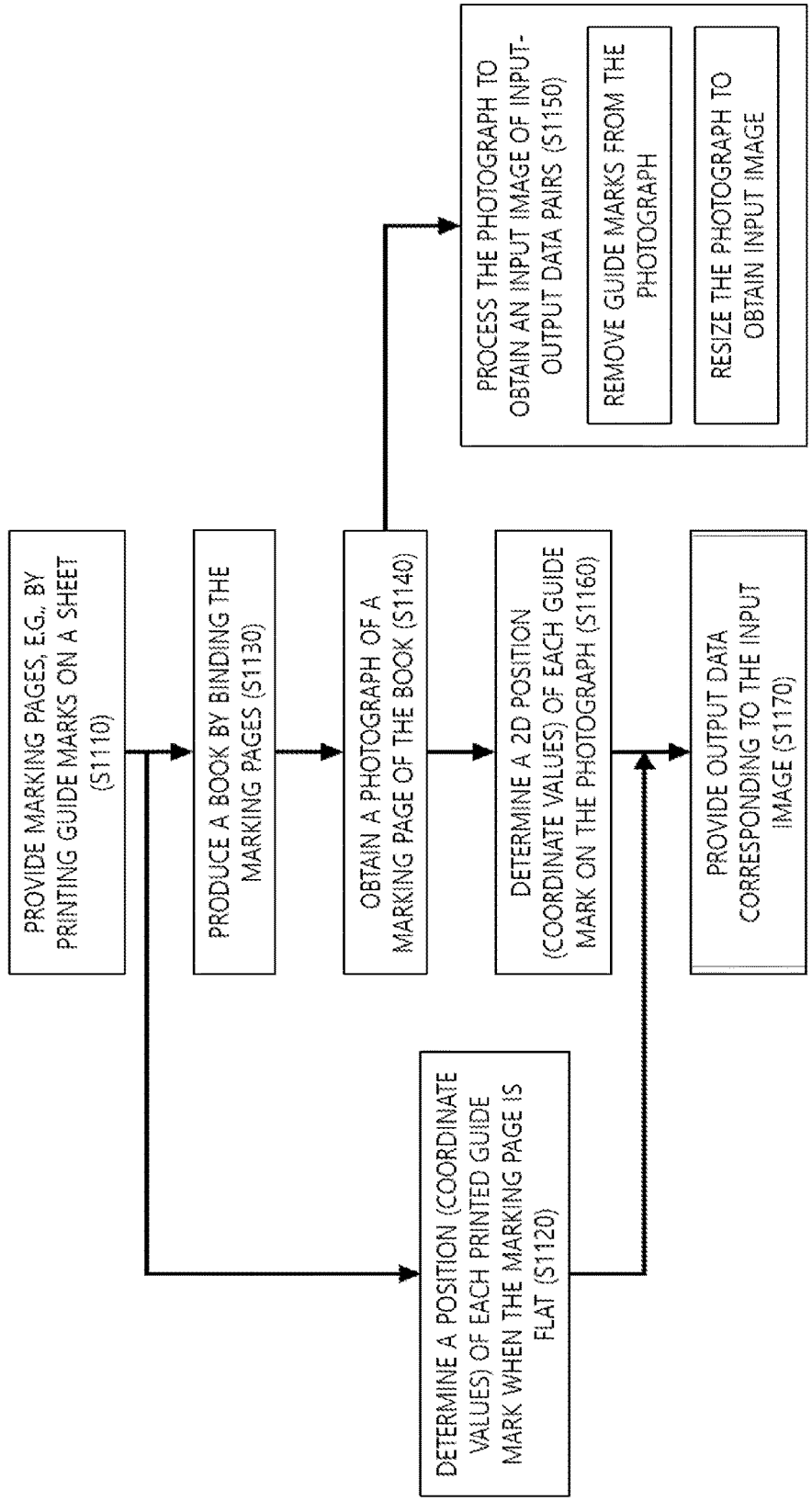
FIG. 11 is a flowchart of preparing input-output data pairs according to an implementation.

FIG. 11 is a flowchart of preparing input-output data pairs according to an implementation. A process to prepare input-output data pairs includes: providing a markings pages by printing guide markings on a book page (S1110), determining a position (coordinate values) of each printed guide marking on the markings page when the markings page is flat (S1120), producing a book by binding multiple markings pages (S1130), obtaining photographs of the markings pages (S1140), processing the photograph to obtain an input image of the input-output data pairs (S1150), determining a position (coordinate values) of each guide marking on the photograph (S1160), and providing output data corresponding to the input image (S1170). In the alternative, input-output data pairs for training the model 320 can be prepared using a process different from the example process of FIG. 11.

Printing Predetermined Layout of Guide Markings on Book Page (S1110)

Figure 12A:
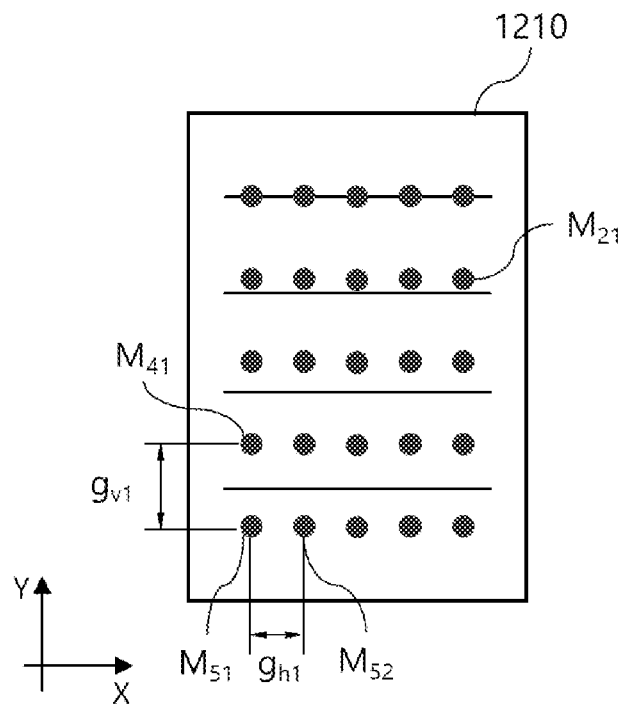
FIG. 12A illustrates a flat page with guide markings (flat markings page) according to an implementation.

FIG. 12A illustrates a flat page with guide markings printed (flat markings page) according to an implementation. A 5×5 array of circular dots (guide markings) is printed on a book page 1210 such that each circular dot is located at a predetermined position relative to a reference (e.g. corner point, edge) of the book page 1210. The 5×5 array includes five rows each aligned along an x-axis direction and includes five columns each aligned along a y-axis direction in the world coordinate system 410. Two immediately neighboring dots in the same column (e.g. $M_{41}$, $M_{51}$) are distanced by a first predetermined interval ($g_{v1}$). Two immediately neighboring dots in the same row (e.g. $M_{51}$, $M_{52}$) are distanced by a second predetermined interval ($g_{h1}$). In implementations, guide markings have one or more shapes or patterns other than a circular dot, and have a layout other than the example 5×5 array.

In an implementation, guide markings are printed in a color different (e.g. red) from texts (e.g. black) in the page 1210. In the alternative, guide markings can be printed in a color same as the texts in the page 1210, and can be printed in two or more colors.

Separating and Rebinding Book to Print Guide Markings

For example, a book is separated into individual sheets before printing guide markings. Then, guide markings are printed at their respective predetermined position on the separated individual sheets. After printing guide markings, the individual sheets are re-bound to a book (S1130). In the alternative, guide markings are printed on pages of a book without separating pages from the book.

Determining Position of Each Printed Mark when Markings Page is Flat (S1120)

Subsequent to printing the guide markings, location of each mark on the markings page 1210 is determined. For example, coordinates of a mark $M_{21}$ on the marked page 1210 is measured using one or more measurement instruments when the page is placed flat. In an implementation, measurement of mark coordinates is performed when the page 1210 is a separate sheet and prior to being bound to a book. In the alternative, coordinates of mark $M_{21}$ can be determined using data of a printing process of the guide markings without performing a measurement.

Obtaining Photographs of Markings Page (S1140)

Figure 12B:
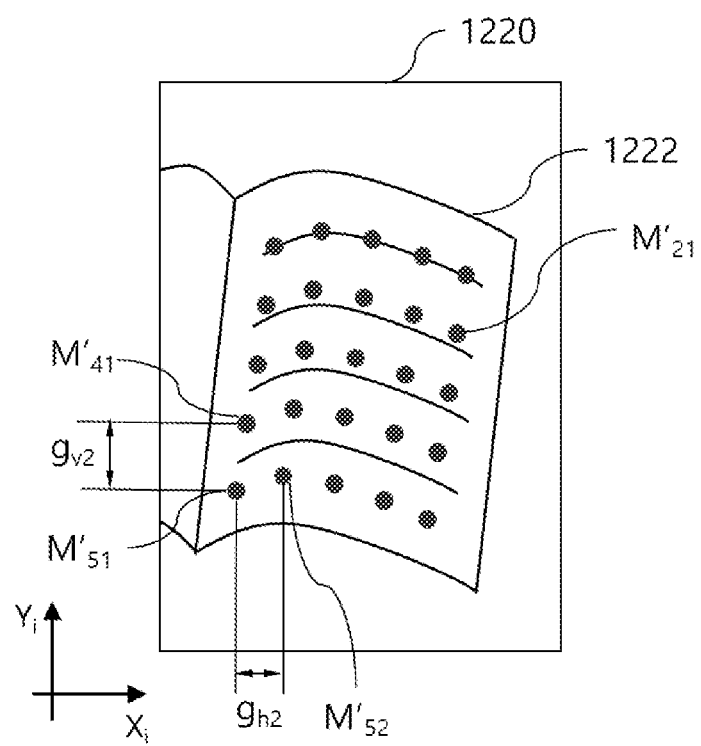
FIG. 12B illustrates a photograph of an opened book page made of the flat markings page of FIG. 12A according to an implementation.

After printing guide markings on book pages, a photograph is obtained for each markings page when the markings page is open and curved. FIG. 12B illustrates a photograph 1220 of the markings page 1210 according to an implementation. The photograph 1220 shows a curved markings page 1222 that includes a distorted 5×5 array of guide markings.

In an implementation, two or more photographs are taken for a single page while moving a camera relative to the page or changing the page's level of curling. In doing so, two or more pairs of input image and output data can be produced for the same page.

Obtaining Markings Page Photograph from Video

To obtain a number of photographs of markings pages efficiently, for example, a video is taken while turning pages of the book (and moving the book), and photographs of the markings pages are generated using one or more frames of the video. In the alternative, photographs of the markings pages can be obtained in a way different from the example.

Generating Training Input Image (S1150)

In an implementation, the input image 1010 has a resolution of 192×144 while the markings page photograph 1220 has a resolution of 3840×2160 (4K) such that the number of pixels in the input image 1010 is less than 1 percent of the number of pixels in the page photograph 1220. The markings page photograph 1220 is converted to the input image 1010. In the alternative, the markings page photograph 1220 can be used as a training input image without further processing.

Removing Guide Markings to Generate Training Input Image

In an implementation, one or more guide markings are removed to generate the input image 1010 from the markings page photograph 1220. For example, guide markings are modified to have a color of the book page paper. Referring to FIG. 10, the top text lines in the input image 1010 is represented using a broken line as some characters in the top text lines are removed together with their overlapping guide markings.

Additional Processing of Background to Generate Training Input Image

In an implementation, in generating the input image (input data) 1010 from the markings page photograph 1220, one or more features can be added, removed or modified. For example, a background of the markings page photograph 1220 (an area outside the curved page 1222) is modified using a predetermined color or pattern to distinguish the curved page 1222 further from the background.

Determining Position of Each Printed Mark in Markings Page Photograph (S1160)

In implementations, the photograph 1220 is analyzed to locate a center for each circular dot, and coordinates of the center are used as coordinates of the guide marking. In the alternative, a point other than the center can be used as a reference to determine coordinates of the guide marking on the $x_i$-$y_i$ image plane.

Determining Image Correction Parameters Corresponding to Input Image (S1170)

The 5×5 array of the guide markings is distorted from the flat markings page 1210 to the markings page photograph 1220 in accordance with the page's distortion. In an embodiment, one or more image correction parameters of the output data 1020 are determined based on relation between a layout of the guide markings in the flat markings page 1210 and a layout of the guide markings in the markings page photograph 1220. An example process to obtain one or more image correction parameters is described with reference to FIGS. 13 and 14.

Iterative Process to Provide Output Data

FIG. 13 is a flowchart of an iterative process for determining one or more image correction parameters of the output data 1020 corresponding to the input image 1010. FIG. 14 illustrates the iterative process of FIG. 13. The iterative process includes: generating a distorted image distorted from the flat markings page 1210 using a set of estimated parameters (S1310), determining a position (coordinate values) of each guide marking on the distorted image (S1320), computing a positional difference between a guide marking on the photograph and a corresponding guide marking on the distorted markings image (S1330), and computing a loss representing the difference between layouts of the guide markings on the distorted image and the photograph of the markings page of the book (S1340). The iterative process further includes determining whether the loss is less than a predetermined threshold and thereby determining of layouts of the guide markings on the distorted image and the photograph of the markings page match (S1350), updating the set of estimated parameters when the loss is not smaller than the predetermined threshold (S1360) and associating the current set of estimated parameters with the input image as corresponding output (S1370). In implementations, a different process from the example process of FIGS. 13 and 14 can be used to determine one or more of the image correction parameters.

Generating Distorted Image Using Current Estimation of Parameters (S1310)

Referring to FIG. 14, an image of virtual flat page 1420 is created based on determined coordinate values of guide markings obtained by the mark position determining process for flat markings page S1120. The virtual flat page image 1420 may not contain texts of the markings page as the iteration process to obtain one or more image correction parameters does not rely on the book page text.

Using a current set of estimated parameters, the virtual flat page image 1420 is distorted to obtain a distorted image (simulated camera image) 1430. Distortion of the virtual flat page image 1420 is performed using an image formation simulation that is based on mathematical models and assumptions used for defining the image correction parameters (e.g. pinhole camera model, assumption of a Bezier curve line).

Determining Position of Guide Markings on Distorted Image (S1320)

The distorted image 1430 is analyzed to obtain distorted location of the guide markings in the distorted image 1430. Referring to FIG. 14, $(X'_{1\text{-}1}, Y'_{1\text{-}1})$ is a distorted 2D location of the left corner guide marking, and $(X'_{5\text{-}5}, Y'_{5\text{-}5})$ is a distorted 2D location of the right bottom corner guide marking in the distorted image 1430. In implementations, distorted image 1430 is analyzed to locate a reference point for each guide markings (e.g. a center of circular dot mark), and coordinates of the reference point is determined as the coordinates of the guide marking in the distorted image 1430.

Computing Positional Difference of Guide Marking (S1330)

In implementations, a positional difference between a guide marking on the photograph 1220 and a corresponding guide marking on the distorted marking image 1430 is computed based on their coordinates determined in the mark position determining processes S1320, S1160.

A positional difference is computed for each of the guide markings, and is used to determine whether the distorted image 1430 matches the markings page photograph 1220.

Computing Loss Representing Guide Marking Layout Difference (S1340)

A loss representing difference between the distorted image 1430 and the markings page photograph 1220 is computed. For example, a loss is computed based on the positional difference computed in the process S1330. For another example, a loss is computed based on difference between (1) a gap between two neighboring guide markings (e.g. $g_{v2}$, $g_{h2}$ shown in FIG. 12B) in the markings page photograph 1220 and (2) a corresponding gap between two neighboring guide markings in the distorted image 1430. A loss can be computed based on one or more of the examples. In implementations, one or more different factors can be used to compute a loss.

Determining Matching Between Distorted Image and Markings Page Photograph (S1360)

The iterative process further includes determining whether the loss is less than a predetermined threshold and thereby determining whether layouts of the guide markings on the distorted image and the photograph of the markings page match. When the loss is less than the predetermined threshold, it can be determined that the distorted image 1430 matches the markings page photograph 1220. When the distorted image 1430 matches the markings page photograph 1220, it is determined that the current estimation of parameters explains the page's distortion, and it is expected that an image flattening processing of the photograph 1220 using the current estimation would generate an undistorted flat rectangular version of the book page.

When the loss is greater than the predetermined threshold, it can be determined that the current set of estimation parameters is not good enough to explain the page's distortion in the markings page photograph 1220.

Updating Estimated Parameters (S1360)

When loss is greater than the predetermined threshold, one or more of estimated parameters are updated. For example, an estimation value for a parameter is updated based on a partial derivative of the loss with respect to the parameter. A Newton-Raphson method can be used to update one or more parameters. In the alternative, one or more mathematical methods different from the example can be used to update estimation of parameters.

Associate Current Set of Estimated Parameters with Input Image (S1370)

When the computed loss is less than a predetermined threshold, the current set of estimated parameters are stored in association with the input image 1010 as the output data 1020.

Obtaining Image Correction Parameter from Corrected Image

Subsequent to determining one or more image correction parameters according to the process of FIGS. 13 and 14, the photograph 1220 is flattened to obtain a corrected image featuring a flattened version of the book page. For example, the photograph 1220 is flattened using one or more of Bezier-curve parameters ($Z_1$, $Z_2$), camera orientation parameters (roll, yaw, pitch), an x-axis translation parameter ($t_{x\_scale}$) and a y-axis translation parameter ($t_{y\_scale}$) and a focal length parameter ($f_{scale}$).

In embodiments, when the camera 200 is modeled using an ideal pinhole camera model, the focal length parameter ($f_{scale}$) represents the camera's z-axis translation and an additional parameter representing the camera's z-axis translation would not be necessary as an image correction parameter (as an output of the model 320). Then, the flattened image is analyzed to obtain a page width ratio ($\Delta u/u_1$) and a page height ratio ($\Delta v/v_1$) explained with reference to FIG. 8. In embodiments, when a fixed aspect ratio is used in a process to remove the background 136 from the flattened image 130, only one of the page width ratio ($\Delta u/u_1$) and the page height ratio ($\Delta v/v_1$) would be necessary to obtain the output image 140 from the flattened image 130.

Input-Output Data Generation Using Simulation

In an implementation, a simulation process can be used to generate input-output data for training a machine-trainable model without printing guide markings on a book and taking a photograph of a markings page. In an example simulation process, a set of output parameters (output data for training) is determined first without referencing to an image featuring a curved book page. A corresponding input data is generated using the determined set of output parameters. The corresponding input data (an image featuring a curved book page, or its modified version) is generated using a process distorting an image of a flat book page (available from scanning of a flat page or virtually creating data of a flat book page) based on the determined set of output parameters (according to mathematical models and assumptions used for defining the image correction parameters, e.g. pinhole camera model, assumption of a Bezier curve line). The simulation process does not require an iteration process of FIG. 14 for finding a set of output parameters that matches an input image. The simulation process can be used to generate a number of input-output data pairs without an iteration process that may require a longer computation time, and can be used to cover a range of the camera's position and orientation that actual photographing of curved book pages does not cover.

Training of Model Using—Supervised Learning

Once input-output data pairs are prepared, one or more supervised learning techniques are used to prepare the machine-trained model 320. In embodiments, any known learning technique can be applied to the training of the model 320 as long as the technique can configure the model 320 to output, in response to training input images, parameters that are within a predetermined allowable error range from desirable output parameters (labels) of the training input images.

Structure of Machine-Trained Model—Convolutional Neural Network

In an implementation, a convolutional neural network (CNN) is used to construct the machined trained model 320. In general, a convolutional neural network requires a smaller number of model parameters when compared to a fully connected neural network. In an implementation, a neural network other than CNN can be used for the machined trained model 320.

Processing by Smartphone and Remote Server

One or more processes of the present disclosure can be performed by the smartphone 200, by a remote server, or by the smartphone and the remote server in combination. For example, when the smartphone 200 does not have the machine-trained model 320 on its local data store, the smartphone 200 transmits the input image 310 to a remote server such that the remote server runs the machine-trained model 320. For another example, the process of FIG. 9-14 to prepare the machine trained model 320 is performed by one or more servers, and the machine trained model 320 is distributed to one or more smartphones. In certain examples, the smartphone 200 generates the output image 130 from the photograph 120 by itself without communicating with a remote server.

Example Architecture of User Computing System

Figure 15:
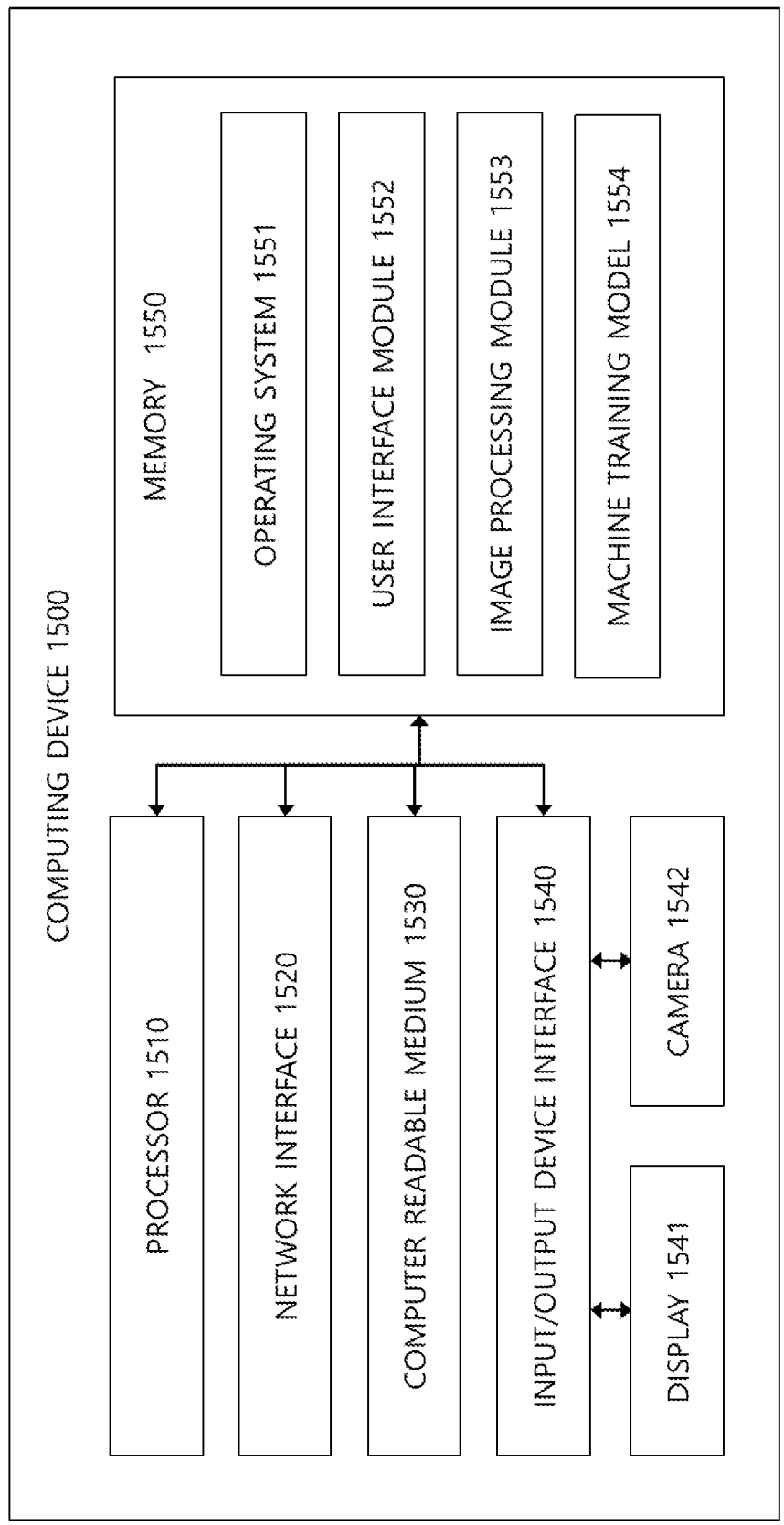
FIG. 15 illustrates an example architecture of a computing device that can be used to perform one or more of invention features according to an implementation.

FIG. 15 depicts an example architecture of a computing device 1500 that can be used to perform one or more of the techniques described herein or illustrated in FIGS. 1-14. The general architecture of the computing device 1500 includes an arrangement of computer hardware and software modules that may be used to implement one or more aspects of the present disclosure. The computing device 1500 may include many more (or fewer) elements than those shown in FIG. 15. It is not necessary, however, that all of these elements be shown in order to provide an enabling disclosure.

As illustrated, the computing device 1500 includes a processor 1510, a network interface 1520, a computer readable medium 1530, and an input/output device interface 1540, all of which may communicate with one another by way of a communication bus. The network interface 1520 may provide connectivity to one or more networks or computing systems. The processor 1510 may also communicate with memory 1550 and further provide output information for one or more output devices, such as a display (e.g., display 1541), speaker, etc., via the input/output device interface 1540. The input/output device interface 1540 may also accept input from one or more input devices, such as a camera 1542 (e.g., 3D depth camera), keyboard, mouse, digital pen, microphone, touch screen, gesture recognition system, voice recognition system, accelerometer, gyroscope, etc.

The memory 1550 may contain computer program instructions (grouped as modules in some implementations) that the processor 1510 executes in order to implement one or more aspects of the present disclosure. The memory 1550 may include RAM, ROM, and/or other persistent, auxiliary, or non-transitory computer-readable media.

The memory 1550 may store an operating system 1551 that provides computer program instructions for use by the processor 1510 in the general administration and operation of the computing device 1500. The memory 1550 may further include computer program instructions and other information for implementing one or more aspects of the present disclosure.

In one implementation, for example, the memory 1550 includes a user interface module 1552 that generates user interfaces (and/or instructions therefor) for display, for example, via a browser or application installed on the computing device 1500. In addition to and/or in combination with the user interface module 1552, the memory 1550 may include an image processing module 1553, a machine-training model 1554 that may be executed by the processor 1510. The operations and algorithms of the modules are described in greater detail above with reference to FIGS. 1-14.

Although a single processor, a single network interface, a single computer readable medium, a singer input/output device interface, a single memory, a single camera, and a single display are illustrated in the example of FIG. 15, in other implementations, the computing device 1500 can have a multiple of one or more of these components (e.g., two or more processors and/or two or more memories).

Other Considerations

Logical blocks, modules or units described in connection with implementations disclosed herein can be implemented or performed by a computing device having at least one processor, at least one memory and at least one communication interface. The elements of a method, process, or algorithm described in connection with implementations disclosed herein can be embodied directly in hardware, in a software module executed by at least one processor, or in a combination of the two. Computer-executable instructions for implementing a method, process, or algorithm described in connection with implementations disclosed herein can be stored in a non-transitory computer readable storage medium.

Although the implementations of the inventions have been disclosed in the context of certain implementations and examples, it will be understood by those skilled in the art that the present inventions extend beyond the specifically disclosed implementations to other alternative implementations and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or sub-combinations of the specific features and aspects of the implementations may be made and still fall within one or more of the inventions. Accordingly, it should be understood that various features and aspects of the disclosed implementations can be combined with or substituted for one another in order to form varying modes of the disclosed inventions. Thus, it is intended that the scope of the present inventions herein disclosed should not be limited by the particular disclosed implementations described above, and that various changes in form and details may be made without departing from the spirit and scope of the present disclosure as set forth in the following claims.

What is claimed is:

1. A method of preparing an input-output data pair for training a machine-trainable model, the method comprising:
    providing a markings page as part of a bound book, the markings page comprising texts and a plurality of predetermined markings thereon;
    providing, for each of the plurality of predetermined markings, 2-dimensional (2D) location when the markings page is at an unbound and flat state;
    opening the bound book such that the markings page is in an open state and is curled as opposed to being flat;
    capturing, using a camera, a photographic image of the markings page in the open state, wherein the markings page appearing on the photographic image is distorted from the unbound and flat state at least due to curling of the markings page in the open state, due to a 3-dimensional (3D) camera location relative to the markings page, and further due to a 3D camera orientation relative to the markings page at the time of capturing the photographic image;
    processing the photographic image to obtain a distorted 2D location of each of the plurality of predetermined markings on the photographic image; and
    computing a set of parameters representing distortion of the markings page on the photographic image, wherein the set of parameters comprises:

a first subset of parameters relating to a 3D camera location relative to the markings page at the time of capturing the photographic image, a second subset of parameters relating to a 3D camera orientation of the camera relative to the markings page at the time of capturing the photographic image, and a third subset of parameters relating to curling of the markings page in the open state at the time of capturing the photographic image, wherein computing the set of parameters involves a process of iteration comprising:

assigning values to the first, second and third subsets of parameters, computing a distorted 2D location for each of the plurality of predetermined markings on a distorted image that would be obtained, using the assigned values, by curling the markings page from the unbound and flat state and by taking a photographic image of the curled markings page using a camera located at a 3D camera location relative to the curled markings page and in a 3D camera orientation relative to the markings page;

computing a loss representing a difference between the captured photographic image and the distorted image that would be obtained using the assigned values, wherein computing the loss uses distorted 2D locations for at least part of the plurality of predetermined markings on the captured photographic image and further uses distorted 2D locations for at least part of the plurality of predetermined markings on the distorted image;

comparing the loss to a predetermined threshold value to determine if the loss is equal to or smaller than the predetermined threshold value;

when it is determined that the loss is greater than the predetermined threshold value, assigning updated values to the set of parameters; and repeating a sequence of computing a distorted 2D location, computing a locational difference, computing a loss, comparing the loss, and assigning updated values until the loss is equal to or smaller than the predetermined threshold value, wherein upon determining that the loss is equal to or smaller than the predetermined value, associating the currently assigned values that have led to the loss equal to or smaller than the predetermined threshold value with the photographic image of the markings page or a modified version thereof such that the photographic image of the markings page or the modified version thereof is an input of the input-output data pair and the currently assigned values are output data of the input-output data pair.

2. The method of claim 1, wherein computing the loss comprises computing, for each of the at least part of the plurality of predetermined markings, a locational difference between the distorted 2D location obtained by processing the captured photographic image and the distorted 2D location computed using the assigned values; and processing at least part of the computed locational differences for the at least part of the plurality of predetermined markings to provide the loss.

3. The method of claim 1, wherein the method comprises associating the currently assigned values with the modified version of the photographic image of the markings page, wherein the method further comprises removing at least one of the plurality of predetermined markings from the photographic image to obtain the modified version.

4. The method of claim 1, wherein the method comprises associating the currently assigned values with the modified version of the photographic image of the markings page, wherein the modified version comprises a lower resolution version of the photographic image in which texts are illegible.

5. The method of claim 1, wherein computing the distorted 2D location for each of the plurality of predetermined markings on the distorted image does not involve actually generating the distorted image.

6. The method of claim 1, wherein the markings page comprises one or more additional predetermined markings for which the 2D locations thereof are not provided, wherein a distorted 2D location is not computed for the one or more additional predetermined markings.

7. The method of claim 1, wherein the third subset of parameters includes two parameters representing a Bezier Curve.

8. The method of claim 1, wherein the set of parameters further comprises at least one page size parameter representing a size of the markings page in a flattened image that would be obtained by dewarping the photographic image of the markings page or a modified version thereof.

9. The method of claim 8, wherein the at least one page size parameter represents a width of the markings page in the flattened image relative to a width of the flattened image.

10. The method of claim 1, wherein the photographic image of the markings page is captured such that four corners of the markings page are included in the captured photographic image, wherein the plurality of predetermined markings is substantially identical in shape and size.

11. The method of claim 1, wherein, in computing the distorted 2D location for each of the plurality of predetermined markings on the distorted image, the distorted image corresponds to a photographic image of the markings page taken by a pinhole camera located at the 3D camera location relative to the markings page according to assigned value(s), wherein the pinhole camera has an intrinsic parameter matrix of $$\begin{bmatrix} f & 0 & x_o \\ 0 & f & y_o \\ 0 & 0 & 1 \end{bmatrix},$$

where f is a focal length of the pinhole camera, and $x_o$ and $y_o$ are offset parameters representing translations of the origin of imaging pixels of the pinhole camera relative to the pinhole of the pinhole camera.

12. The method of claim 11, wherein at least one of the first subset of parameters defining the 3D camera location represents the pinhole camera's translations along an optical axis of the pinhole camera relative to the markings page, and further represents the focal length f of the pinhole camera such that the model does not provide a separate parameter representing the focal length f other than the set of parameters.

13. The method of claim 11, wherein the photograph has a width of $w_i$ and a height of $h_i$, wherein $x_o$ is the half of the photograph width $w_i$ and $y_o$ is the half of the photograph height $h_i$.

14. A method of preparing a machine-trained model, the method comprising:

generating a plurality of input-output data pairs according to the method of claim 1; and training a machine-trainable model using the plurality of input-output data pairs to provide a machine-trained model such that the machine-trained model is configured to generate values for the set of parameters in response to an input of an image of an opened book page.

15. A non-transitory storage medium storing a plurality of instructions executable by a computer, wherein the plurality of instructions, when executed, causes the computer to generate a plurality of input-output data pairs according to the method of claim 1.

\* \* \* \* \*